(12) United States Patent
Touati et al.

(10) Patent No.: US 12,260,862 B2
(45) Date of Patent: *Mar. 25, 2025

(54) METHODS AND SYSTEMS FOR APPLICATION INTEGRATION AND MACROSYSTEM AWARE INTEGRATION

(71) Applicant: Incentive Marketing Group, Inc., Arlington, VA (US)

(72) Inventors: Harrison Touati, Arlington, VA (US); Adam Branch, Arlington, VA (US)

(73) Assignee: Incentive Marketing Group, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,671

(22) Filed: Aug. 16, 2023

(65) Prior Publication Data

US 2023/0395076 A1    Dec. 7, 2023

Related U.S. Application Data

(63) Continuation of application No. 17/081,057, filed on Oct. 27, 2020, now Pat. No. 11,756,543.

(51) Int. Cl.
| | |
|---|---|
| *G10L 15/22* | (2006.01) |
| *G06F 3/16* | (2006.01) |
| *G06F 8/36* | (2018.01) |
| *G06F 8/71* | (2018.01) |
| *G10L 15/18* | (2013.01) |

(52) U.S. Cl.
CPC .......... *G10L 15/22* (2013.01); *G06F 3/167* (2013.01); *G06F 8/36* (2013.01); *G06F 8/71* (2013.01); *G10L 15/1822* (2013.01); *G10L 2015/223* (2013.01)

(58) Field of Classification Search
CPC ............ G10L 15/22; G10L 15/1822; G10L 2015/223; G06F 3/167; G06F 8/36; G06F 8/71
See application file for complete search history.

(56) References Cited

U.S. PATENT DOCUMENTS 9,626,876 B2 * 4/2017 Reeves .................... G09B 9/02
2005/0262191 A1 * 11/2005 Mamou ................ G06F 16/254
709/203

(Continued)

*Primary Examiner* — Minh Chau Nguyen
(74) *Attorney, Agent, or Firm* — LSIP Law LLC

(57) ABSTRACT

Methods and systems for multi-modalities integration via speech, chatbot, low-code, and no-code enterprise integration. Methods and systems for application integration for both application integration and macro/system aware integration technology. Methods and systems for integrating services between different software systems, the computer having a processor and a data repository including storing one or more service connectors configured to connect an origin software system to a target software system in the data repository, receiving integration instructions, the integration instructions including at least one of the origin software system, a directionality of the integration, the directionality indicating whether the integration is unidirectional or bidirectional, a frequency of integration, and the target system software, and performing the integration from the origin software system to the target software system using the one or more service connectors according to the integration instructions.

20 Claims, 22 Drawing Sheets

(56) References Cited

U.S. PATENT DOCUMENTS

| | | | |
|---|---|---|---|
| 2006/0069717 A1* | 3/2006 | Mamou | G16H 40/20 709/203 |
| 2006/0101474 A1* | 5/2006 | Magown | G06F 9/5027 719/315 |
| 2018/0278471 A1* | 9/2018 | Burli | G06F 9/451 |
| 2020/0175048 A1* | 6/2020 | Ross | G06F 8/38 |

\* cited by examiner

RHINO | Integration Management | Search connectors... | 📇 Integration Agent | *f⨳* Advanced 🔒 Account | ⊕ ◢ ✲

Workspace > ⇉ Rhino Core > ⊞ Connected Systems  ⊕ Add New    Registered endpoints ready to be used as a source or target system now ServiceNow

| ID | Name | Host | Activity | Type | Description |
|---|---|---|---|---|---|
| ○SN0036 | DEV93-G | ven01993.service-now.com | ∼ | Consumer | Endpoint to importing critical change requests |
| ○SN0037 | DEV93-P | ven01993.service-now.com | ∼ | Producer | Real-time export approval requests |
| ○SN0012 | PROD Service | myapps.service-now.com |  | Consumer | Used for comments and status updates to incidents |

AWS S3

| ID | Name | Bucket | Type | Description | Pipelines |
|---|---|---|---|---|---|
| ○S300132 | dev-labs | amplify-amplify-auth-dev-144422-deployment | Consumer | File storage for backup and analytical purpose | 2 active | 8 inactive |

◇ Jira

Integration Agent (Show collected data)

Great! let's connect to your ServiceNow system at https://www.servicenowmyistance.com.

yes create integration

Gotcha, what's the origin system?

ServiceNow-2

Can you enter one or more targets?

My GCP Bucket is this a single or bidirectional integration?

bidirectional

Would you like this integration to be real time, hourly, or daily?

Ask something...

Workspace > Rhi...

Integrations now  ID: SN0036

ID: SF0017 now  ID: SN0036

Collected Data

Target
My GCP Bucket
Target system to send data

Event
Record Created or Updated
Event that triggers integration pipeline

Action
Push to Jira
Integration actions

Type
Bidirectional
Pipeline direction type

Schedule
Real time
Integration schedule

Submit

570

RHINO | Integration Management | | Search connectors... | | Rhino Core | Blockchain | | Integration Agent | | Advanced | Account |

Workspace > Rhino Core > Blockchain     Blockchain registry

Selected Block

ID: 7   Created: 2020-08-04 00:46:06   Created by: SYSTEM
Hash: 53abd6554b85bb56dc3372e9b274abdf7a02af7aa761e649081db61d89245245
Previous Hash: c699370d80dc35e729a590e8cb062bd41cf6eb16dfc265af02882b8c2ddc40b9

Blocks

| | | |
|---|---|---|
| 1 | 2020-08-04 00:44:49 | |
| 2 | 2020-08-04 00:45:46 | |
| 3 | 2020-08-04 00:45:46 | |
| 4 | 2020-08-04 00:45:46 | |
| 5 | 2020-08-04 00:46:06 | |
| 6 | 2020-08-04 00:46:06 | |
| 7 | 2020-08-04 00:46:06 | |
| 8 | 2020-08-04 00:53:20 | |

| ID | Origin | Target | Body |
|---|---|---|---|
| 23 | Google Sheets | Google Cloud Storage | {"description":"abc","name":"an additional record"} |
| 24 | S3 | Google Cloud Storage | {"description":"1"} |
| 25 | Salesforce | Salesforce | {"description":"abc","name":"1"} |
| 26 | Salesforce | S3 | {"description":"abc","id":"1","name":"that one"} |
| 27 | Google Cloud Storage | ServiceNow | {"id":"that one"} |
| 28 | RDS | Salesforce | {"id":"that one","name":"that one"} |
| 29 | MySQL | Google Cloud Storage | {"description":"that one","name":"type10"} |
| 30 | S3 | MySQL | {"id":"1","name":"abc"} |

FIG. 7

METHODS AND SYSTEMS FOR APPLICATION INTEGRATION AND MACROSYSTEM AWARE INTEGRATION

BACKGROUND OF THE INVENTION

1. Field of Invention

Example embodiments relate to methods and systems for application integration and automation, as well as macrosystem aware integration. More particularly, example embodiments relate to methods and systems for multi-modalities integration between different software systems.

2. Description of Related Art

Business typically use a wide variety of commercial software applications for different purposes and operations such as, e.g., financial, human resources, sales management, email, e-commerce, and many other such systems. Different resources and specialized personnel may be needed to install, maintain and integrate these systems as well as to reconfigure the systems with updates occur that may result in these systems no longer functioning due to changes and resultant compatibility changes. As a result of the challenges and opportunity, a number of tools are provided to help integrate and automate these disparate systems. Currently available products offer SaaS-based solutions for integration of disparate office systems. To facilitate software integrations, standards such as the Enterprise Service Bus (ESB) has been used for on-premises integration. In addition, services such as iPaaS and Robotic Process Automation (RPA) have been developed for cloud-based integrations. Some enterprise integrations involve a combination of ESB and iPaaS. The Hub-Spoke model from Infosys typically provides the ability to download the spoke environment locally. These platforms provide local modules which can connect back to the cloud server; however, the implementation of the inventive system makes use of other technologies than are described in this patent; namely, machine learning, artificial intelligence (AI), bots, natural language processing (NLP), and block chain.

SUMMARY

Despite the availability of the above-discussed applications, a high degree of technical expertise remains required to provide software integration and automation of disparate enterprise systems. Integration can be understood as the coupling of two or more connected systems to allow the flow of data and other information between the two connected systems. Example embodiments bridge a gap between the organizational requirements to integrate the enterprise software without the cost and logistical issues of scheduling specialists each time a specific new enterprise product is purchased, or requires changes in configuration and/or an error or adjustment in the configuration needs to be remediated, requiring the technical proficiencies that are otherwise required.

Example embodiments provide a platform that offers advantages in the following areas: 1) Low- or No-Code Business Application Integration; 2) Conversation artificial intelligence (AI)/machine learning (ML) in the context of Business Application Integration; and 3) use of block-chain or other ledger technologies to enable record keeping associated with the integration efforts.

Example embodiments makes use of the above-discussed technologies to guide end-user integration and reduce, limit or eliminate the necessity of costly professional integration services, and provide the flexibility to provide such integration using multi-modal methods for effecting the integration through a combination of conversational AI and/or low- or no-code specifications. Furthermore, the system may make use of block-chain to enhance the tracking and audit functionality of the system.

Additional advantages and novel features of these example embodiments may be set forth in part in the description that follows, and in part may become more apparent to those skilled in the art upon examination of the following or upon learning by practice of the invention.

BRIEF DESCRIPTION OF THE DRAWINGS

Various example embodiments of the systems and methods may be described in detail, with reference to the following figures, wherein:

FIG. 3 is an illustration of a plurality of connected systems, according to various example embodiments;

FIGS. 5A-5E illustrate various steps of the creation of an integration between two services, according to various example embodiments;

FIG. 7 is an illustration of a blockchain registry, according to various example embodiments;

DETAILED DESCRIPTION

Figure 1:
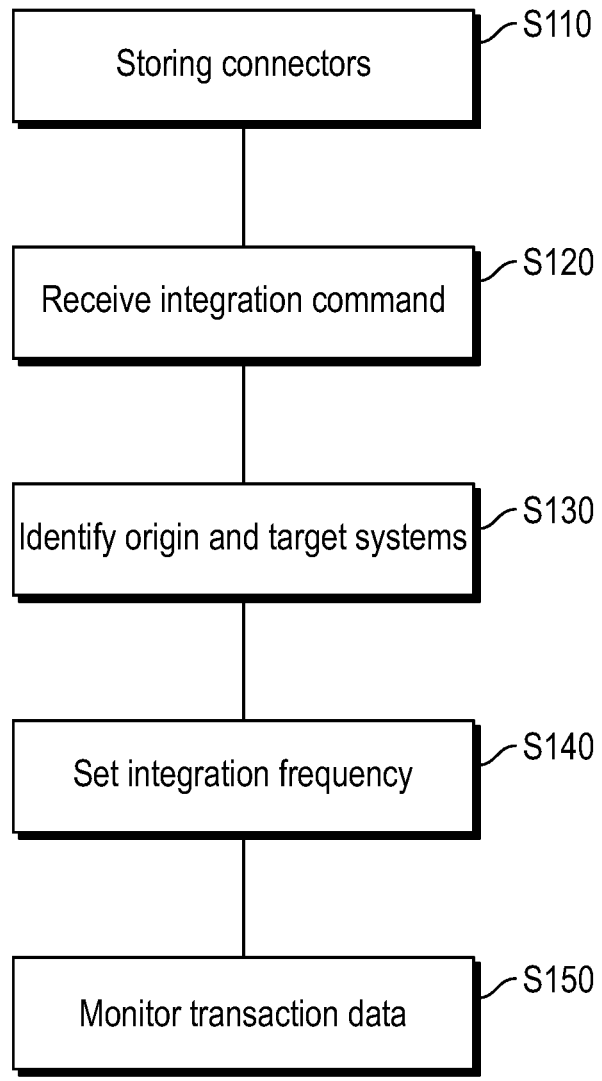
FIG. 1 is a flowchart illustrating a method of software integration and/or automation in accordance with example embodiments.

These and other features and advantages are described in, or are apparent from, the following detailed description of various example embodiments.

It may be understood that when an element is referred to as being "on," "connected" or "coupled" to another element, it can be directly on, connected or coupled to the other element or intervening elements that may be present. In contrast, when an element is referred to as being "directly on," "directly connected" or "directly coupled" to another element, there are no intervening elements present. As used herein the term "and/or" includes any and all combinations of one or more of the associated listed items. Further, it may be understood that when a layer is referred to as being "under" another layer, it can be directly under or one or more intervening layers may also be present. In addition, it may also be understood that when a layer is referred to as being "between" two layers, it can be the only layer between the two layers, or one or more intervening layers may also be present.

It may be understood that, although the terms "first", "second", etc. may be used herein to describe various elements, components, regions, layers and/or sections, these elements, components, regions, layers and/or sections may not be limited by these terms. These terms are only used to distinguish one element, component, region, layer or section from another element, component, region, layer or section. Thus, a first element, component, region, layer or section discussed below may be termed a second element, component, region, layer or section without departing from the teachings of example embodiments.

In the drawing figures, the dimensions of layers and regions may be exaggerated for clarity of illustration. Like reference numerals refer to like elements throughout. The same reference numbers indicate the same components throughout the specification.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It may be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It may be further understood that terms, such as those defined in commonly-used dictionaries, may be interpreted as having a meaning that is consistent with their meaning in the context of the relevant art and may not be interpreted in an idealized or overly formal sense unless expressly so defined herein. As used herein, expressions such as "at least one of," when preceding a list of elements, modify the entire list of elements and do not modify the individual elements of the list.

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure. Although the tubular elements of the embodiments may be cylindrical, other tubular cross-sectional forms are contemplated, such as square, rectangular, oval, triangular and others.

Reference may now be made in detail to embodiments, examples of which are illustrated in the accompanying drawings, wherein like reference numerals refer to the like elements throughout. In this regard, the present embodiments may have different forms and may not be construed as being limited to the descriptions set forth herein. Accordingly, the embodiments are merely described below, by referring to the figures, to explain example embodiments of the present description.

Example embodiments may include a system, a method, and/or a computer program product at any possible technical detail level of integration. The computer program product may include a computer readable storage medium (or media) having computer readable program instructions thereon for causing a processor to carry out example embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform example embodiments.

Example embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a flowchart illustrating a method of software integration in accordance with example embodiments. In example embodiments, the method starts at step S110 where prebuilt connectors are stored. A system according to various example embodiments stores a list of prebuilt connectors, such as, e.g., Salesforce, ServiceNow, Jira, and the like. In example embodiments, connectors can also be applications, application programming interfaces (APIs), or even conversational/robotic process automation (RPA) Bots, allowing users to string together and orchestrate bots with their applications.

Figure 2:
FIG. 2 is an illustration of a list of pre-existing connectors, according to various example embodiments.

In example embodiments, connectors have prebuilt actions and events associated with the prebuilt actions. In example embodiments, an event is something that happens in a system such as e.g., the creation of a bug, the updating of a record, or the sending of an email. In example embodiments, an action is something that you want done in a system, such as creating a record or running a process. In principle, events and actions are interchangeable. Details of prebuilt connectors are provided in FIG. 2, which illustrates a list of pre-existing connectors, according to various example embodiments. In exemplary embodiments, connectors may include databases, automation platforms, chatbots, custom systems, and software applications both hosted on the cloud and on premise.

In example embodiments, a connected system is a specific instance of a connector. For example, while the system comes with a ServiceNow connector, a user may need to connect to multiple different connected ServiceNow instances. Each of these instances may be a connected system. In exemplary embodiments, allowing multiple connected systems for a given connector lets end users connector multiple instances or servers of the same software. In example embodiments, the systems currently connected can be illustrated. Example connected systems are illustrated in FIG. 3, according to various example embodiments.

In example embodiments, the method at step S120 receives instructions to start integration or automation. For example, the sending of an email may be the event that initiates an integration, while the very same email may be sent as a result of the action of another integration. In example embodiments, users become able to create custom connectors and define the actions and events for them, enabling them to expose custom APIs and applications which do not currently have pre built connectors.

In example embodiments, the method at step S130 determines which service or services are the origin systems, i.e., service(s) to be integrated into one or more target services. In example embodiments, a user can build an integration by selecting a source connected system, a target connected system, and events and actions for those systems. In example embodiments, the user may be able to select multiple targets and actions that can be initiated from an event. For example, the target is Jira and MySQL and the action is to post an incident when it is created in Service Now.

In example embodiments, the method at step S140 sets the frequency of integration. In example embodiments, a user may be able to enter the frequency of an integration. In exemplary embodiments, the system may recommend a frequency based on the previously selected fields, favoring real-time integrations when appropriate and possible. In example embodiments, a user may indicate if an integration is one way or bidirectional. In example embodiments, a user is able to map data between actions and events using, e.g., machine learning (ML)-assisted graphical user interface (GUI).

In example embodiments, as integrations take place as discussed above, the transactions occurring between the integrated services may be stored for further analysis.

Figure 8:
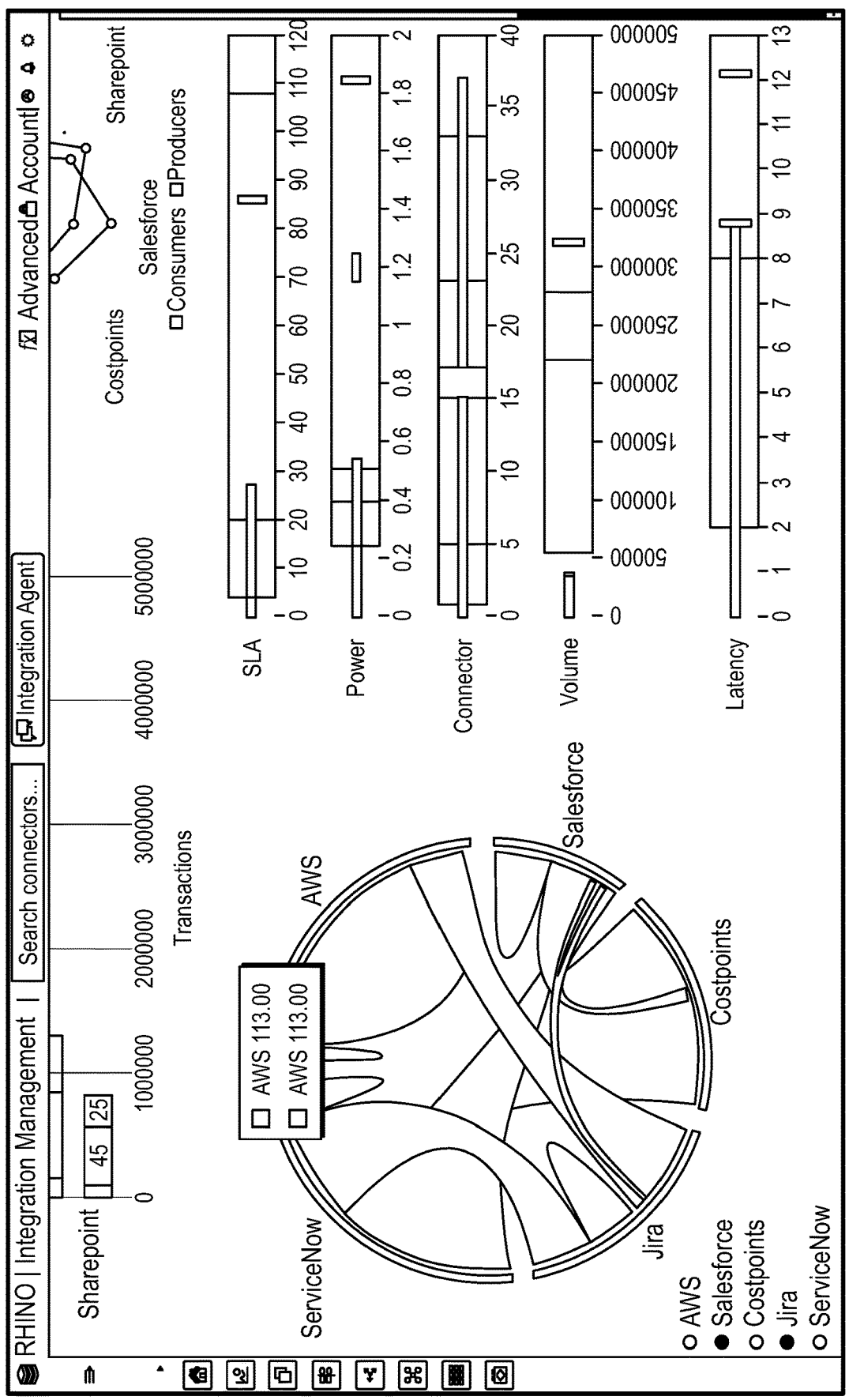
FIG. 8 is an illustration of transactions reporting between various systems, according to various example embodiments.

Integration Features: In example embodiments, each integration that is created may be run at the interval specified during creation (in real time, hourly, or daily). As integrations run, requests may be made to both source- and target-connected systems in order to identify events and perform actions. In example embodiments, transactions may be stored for analysis. FIG. 8 discussed below is an illustration of transactions reporting between various systems, according to various example embodiments.

In example embodiments, the method at step S150 monitors the data that is transferred as a result of the integration. In example embodiments, the system may periodically check connected systems for improper edits, and automatically correct them. In exemplary embodiments, users may also chose for the system to notify them and report on issues to allow for manual correction instead of automatic correction. In example embodiments, the user may configure for notifications to be sent upon the identification of bad data and/or to not autocorrect issues if needed. In example embodiments, transactions may also be stored in a blockchain ledger for data integrity. FIG. 7 is an illustration of a blockchain registry, according to various example embodiments. In example embodiments, the blockchain registry lists the transactions that are or have been logged for each block.

In example embodiments, the system may monitor, e.g., automatically monitor, the response times from interactions with external systems to identify performance issues in advance. Once these are identified, the system may automatically slow down integrations to protect the connected systems. In example embodiments, transactions taking place during or for the purpose of an integration may be analyzed by end users to query, sort, and visualize integration features.

In example embodiments, the system design may include the following: i) Event Driven—In example embodiments, system components communicate through a common event log as opposed to through APIs to maximize scalability and performance; ii) Serverless Technologies—As much as possible, the system may use serverless technologies and containers to maximize scalability and performance while keeping costs low; iii) Micro/Nanoservices—In example embodiments, the system is designed as a series of small components, each with their own functionality. The components communicate primarily through the event log. In exemplary embodiments, the separation of concerns provided by a microservices design may allow for a reduction in system complexity and an increase in development speed.

In example embodiments, to add additional capabilities of the method, a platform configured to implement the method may provide an API and can be integrated with tools that facilitate enterprise integration (such as Salesforce, IBCO, Boomi, Informatica, Talend, Adeptia, Cleo, Axway, Jitterbit, Spring, Amazon Web Services (AWS)). In addition, the system can be integrated with systems that provide additional enterprise IT management capabilities such as Moogsoft as well as virtual machine software and on-premise management software packages.

Figure 4:
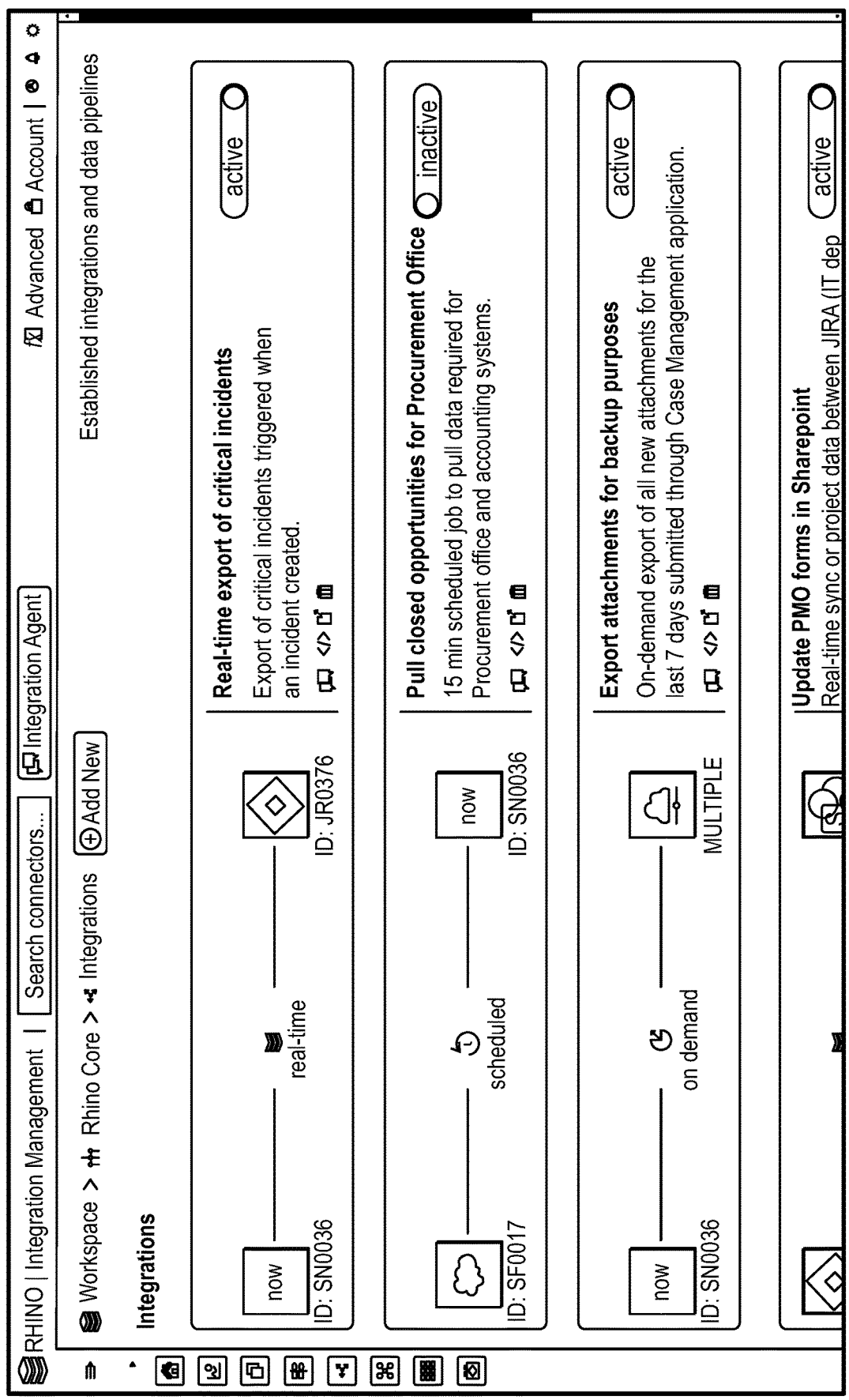
FIG. 4 is an illustration of a plurality of integrations, according to various example embodiments.

Example embodiments can make use of menu-based bots (also known as chatbots), where users select a path based on a menu of options that the bot delivers to the end user. The platform according to example embodiments exposed connected enterprise systems as Bots. The Bots expose connected systems as bots where users can perform actions through the use of speech. NLP Bots, which rely on natural language processing to interpret free text and make use of intent and entity extraction, interpretation and mapping to functional actions involving software integration. In the case of NLP bots, a user may ask natural language questions in a dialog box, i.e., to a virtual developer, and an answer may be provided back to the user based on information available in the integrated systems. If more specifics are required to formulate the answer, the user may be prompted for clarifications. Such mapping can be further informed and refined by both manual input and refinements to machine learning systems coupled with rules-based algorithms that define software specific systems as well as general logic that is generically applicable to a wider range of software systems. Examples of connected services is provided in FIG. 3. The platform can also refine its ML models through the use of aggregate integration data coupled with curated outcomes data (such as self-reported feedback of the integration, sentiment analysis (both automated and/or manual) of bot correspondence and objective measures of integration efficacy such as results of log-files, data validation, and any violation or help desk issues that occur after an integration). Integration with tools such as ServiceNow which is a ticketing tool that processes and catalogs customer service requests, providing reporting data on incidents, changes, problems, and other services using tools like ServiceNow. ServiceNow integration can enable quantitative and qualitative feedback from ServiceNow and other ticketing and integration services. Integration can be understood as the coupling of two or more connected systems, and FIG. 4 is an illustration of integrations, according to various example embodiments.

Figure 5A:
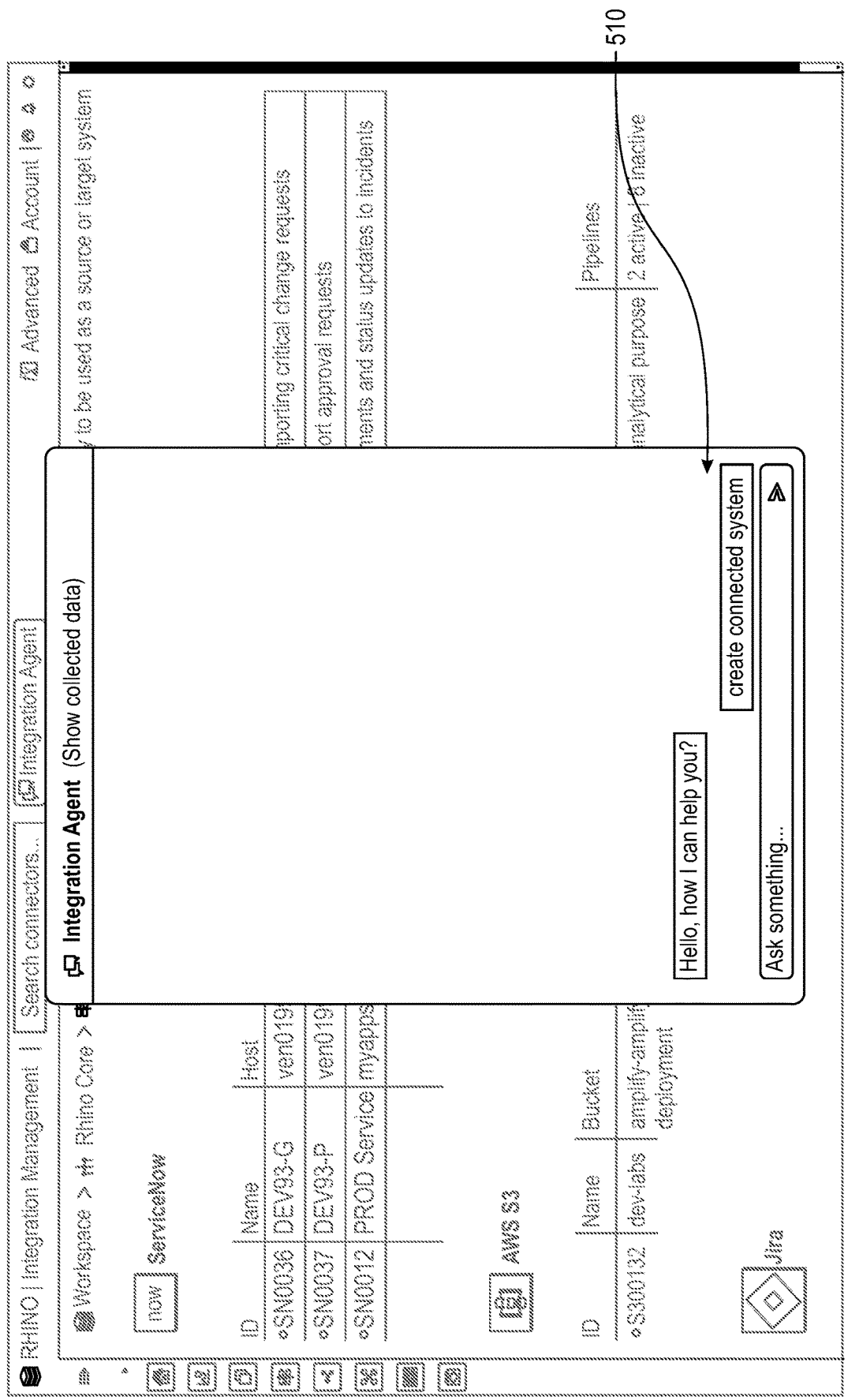
Figure 5B:
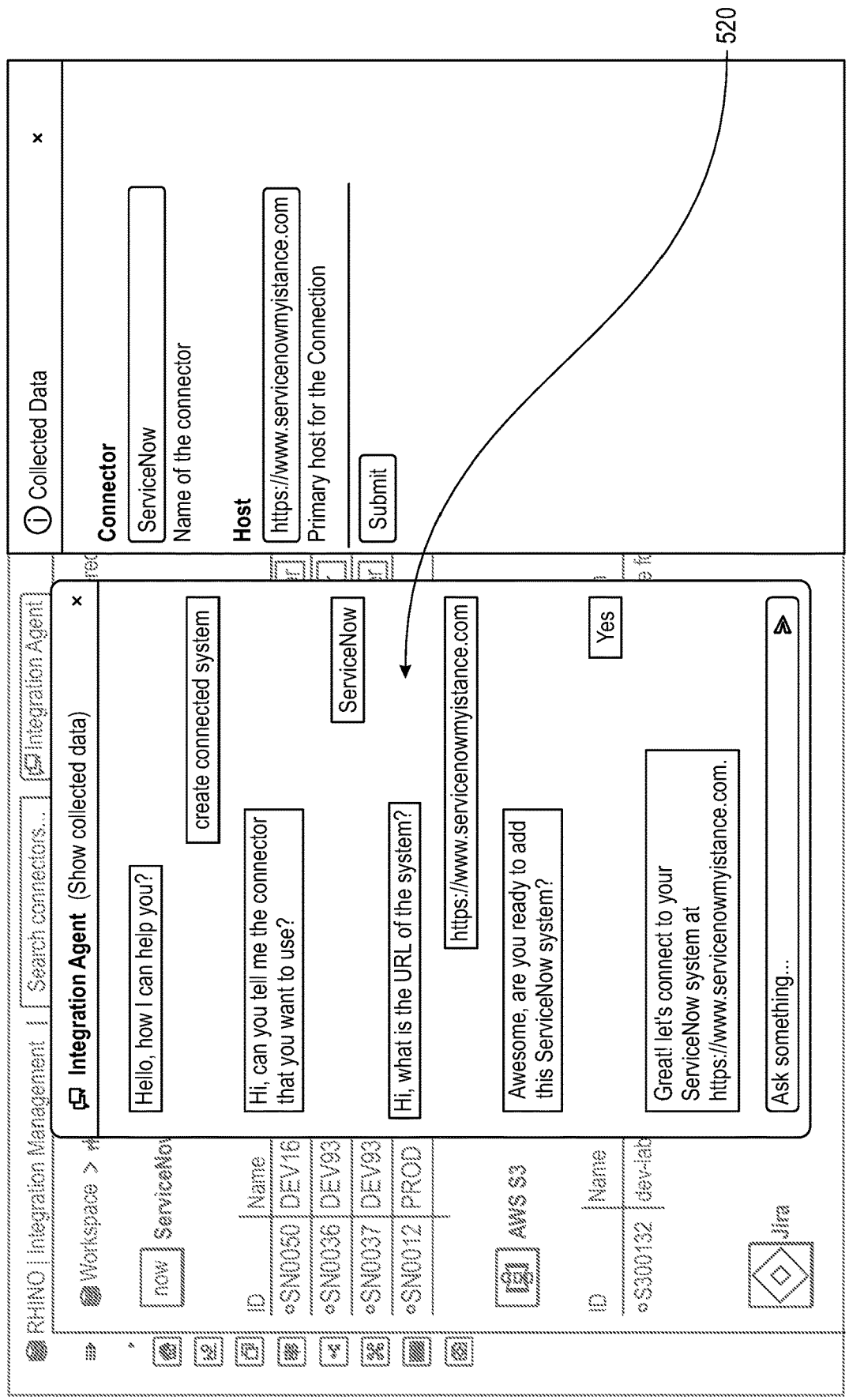
Figure 5C:
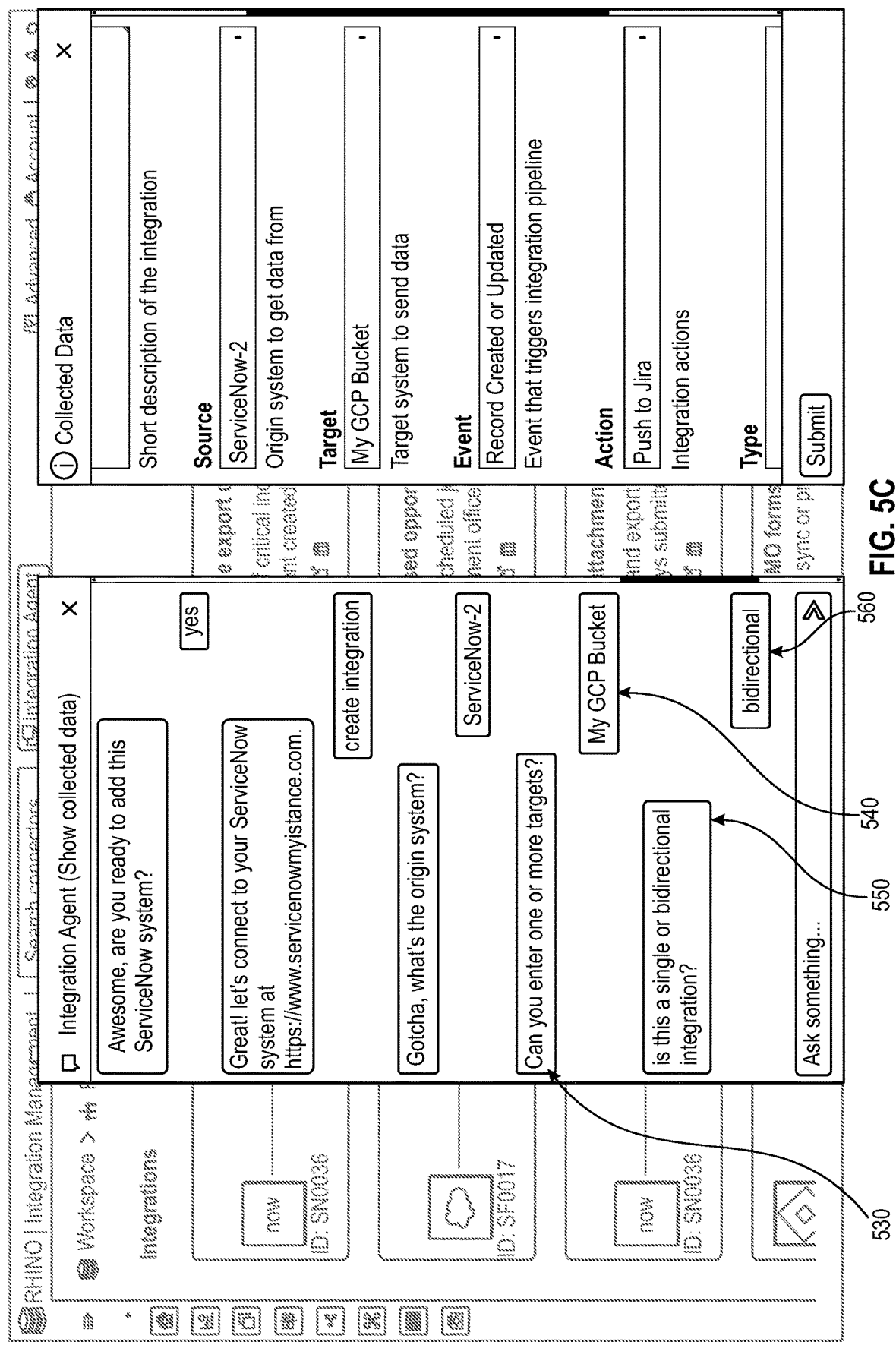

An example of the creation of an integration or process automation via a chatbot is illustrated in FIGS. 5A-5D, according to various example embodiments. In FIG. 5A, the integration starts when a command 510 to, e.g., "create an integration" is entered in the chat box. In exemplary embodiments, the user may not need to enter that exact command, as the NLP algorithms can interpret the meaning of natural language. For example, a user could say "I want to create a process automation", or "let's make an integration", or "I want to automatically integrate ServiceNow with Jira", and the like. In all of the previous examples, the system may still understand that the user wants to create an integration and begin the creation process. In response, as illustrated in FIG. 5B, the system according to various example embodiments enters into an interactive exchange 520 to identify which origin service to integrate. In the illustrated example, the origin system is identified as "ServiceNow." FIG. 5C illustrates the integration of files from ServiceNow to allow documents to flow from ServiceNow to another service, in this case Google Cloud Storage. In example embodiments, the system request entry 530 of one or more target services. When the target service is entered in chat box 540, in example embodiments, the method may request clarification of whether the integration is unidirectional of bidirectional in chat box 550. Unidirectional integration is when integration is from only one service to another. For example, unidirectional integration of documents from ServiceNow to Google Cloud Storage is the integration of documents only from ServiceNow to Google Cloud Storage but not from Google Cloud Storage to ServiceNow. Bidirectional integration between ServiceNow and Google Cloud Storage allows the flow of documents from ServiceNow to Google Cloud Storage as well as from Google Cloud Storage to ServiceNow. In example embodiments, the directionality of the integration can be entered in chat box 560. In example embodiments, the method may request entry of the frequency of integration, e.g., real time, hourly or daily, in chat box 570.

In example embodiments, although the above integration parameters are entered in a piecemeal fashion by successive prompts, the entire integration parameters may be entered in one continuous line of natural language instruction. A greater discussion of the configuration of chatbots providing information in a conversational environment is provided below with respect to FIG. 14.

In example embodiments, the system may also provide the capability of further escalation to a consultative human-based developer to resolve integration challenges. To further the ability to offer bi-directional exchange between the end-user and the platform according to example embodiments, the system also offers dynamic question-answer (QA) regarding the integration process and integration status, as well as validation and violations and other integration metrics. As violations and errors occur, the system may report to end-users, notify them through email with recommendations for fixes, and attempt to auto correct the issue when appropriate. Users may be able to enable or disable any of these violation features. This dynamic QA can make use of the Integration Platform as a Service (IPaaS) and other standards for dynamically recording system status and integrations such as IT service management (ITSM) and others.

The platform according to example embodiments can also provide higher accuracy of the NLP by enabling the ability to transverse a taxonomy of vocabulary associated with integration tasks at different levels or steps of the integration as well as consideration of different enterprise software packages.

In example embodiments, if the intent and/or entit(ies) cannot be determined from instructions entered by a user, the NLP can suggest the closest matches from a library, or enable manual low- or no-coding. This step can also occur during an integration if/when the system or the end-user determines that it is useful to switch modality from NLP to low or no code. In example embodiments, a low-code wizard may be available for record creation. Both the core chatbot and the low code wizard are synchronized with respect to user inputs so that a user can start a process through one and finish through another. In addition, while not preferred, a simple excel-like language of functions can be used when complex mappings are required such as string substitutions or aggregations. In example embodiments, low code is a visual approach to software development which abstracts and automates every step of the application lifecycle to enable rapid delivery of a variety of software solutions. For example, a low code approach allows developers to drag and drop application components, connect them together and create, e.g., an application.

In example embodiments, NLP is coupled with Chatbot technology to enable text and/or voice based interaction with the system. Many traditional enterprise platforms offer the ability to switch between low code and traditional coding views. We are instead offering the ability to switch between conversational and low code views. In exemplary embodiments, this may allow users to see in real time how their conversation with the Chatbot impacts the building of the software, by viewing the automatic updating of the low code interface as they talk to the Chatbot. Conversely, the Chatbot may be aware of all updates made directly to the low code interface. In exemplary embodiments, an advantage of the system is that NLP may improve over time in aggregate as well as improving individual integration performance. The system can learn from low-code activities and use the interactions with NLP as compared to low-code interactions to offer additional training to the ML system and through the use of feedback generated from the data regarding the disparity between the NLP interpretation and the low-code specifications, system training and feedback may occur. Hence, the platform according to example embodiments may better translate the user's instructions using ML with more accurate interpretation of the user's intent. Hand-tuning and interpretation of the platform can further advance its accuracy. The combination of low-code and chatbot interfaces may allow users to rapidly bring about hyper automation transformations to their businesses by delivering RPA and integration technologies.

Example embodiments can also allow for the discovery, also referred to as self-discovery, of APIs either through ingestion of standardized API catalogs or through a self-discovery process of making use of test-cases and examining inputs/outputs and validating the API and its subsequent integration. Example embodiments provide the opportunity to discover and integrate multiple APIs from a comprehensive range of enterprise business software platforms.

API discovery can be further advanced with the inclusion of mapping intent to natural language commands. In this way, the system can expand in compatibility with enterprise software systems with or without human integration efforts either through direct software engineering between the enterprise systems or engineering of the platform according to example embodiments that affords such integration.

In example embodiments, the platform may be hosted on premises, i.e., on a computer used to perform the integration, on the cloud accessible remotely by a plurality of computers, and inside low code platforms, e.g., as an application inside of a service. In the case of a low code inside of a platform, the integration platform may be built as an application on top of the existing low code platform. An example would be configuring the platform as an application that can be installed in a service such as Appian, Salesforce, or ServiceNow.

Figure 5E:
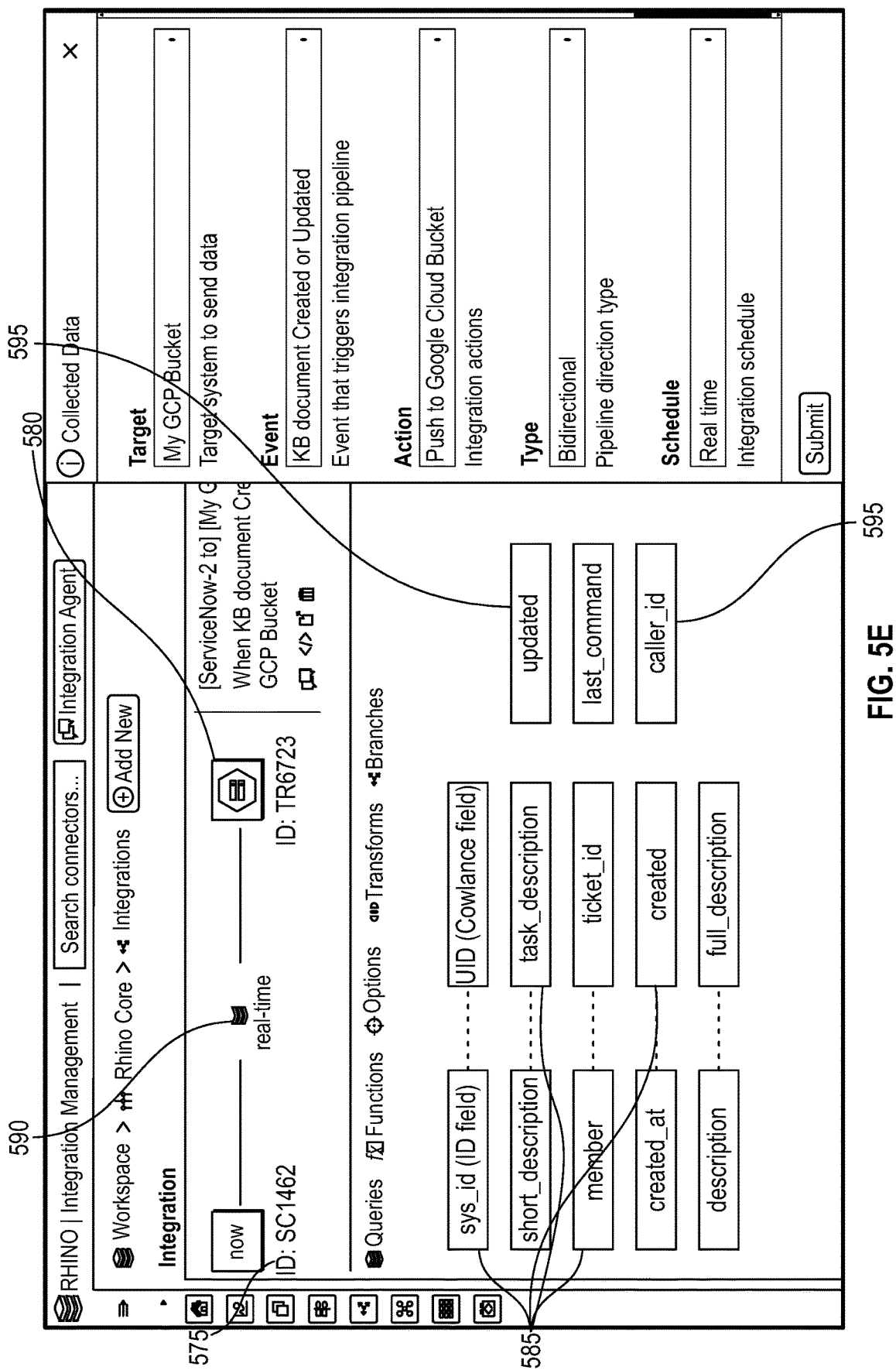

FIG. 5E illustrates a user interface displaying the result of an integration, according to various example embodiments. In example embodiments, the origin service 575 and the target service 580 are displayed, and the integrated fields 585 are mapped, e.g., automatically mapped. In example embodiments, the display also includes the frequency of integration 590. In example embodiments, if the system does not automatically map the fields and leaves some unmapped fields 595, then the fields 595 may be manually mapped if such mapping is necessary or beneficial to the successful integration of the origin service 575 and the target service 580. In addition, users can manually update automatically configured mappings to fine tune integrations and automations. This can be done during the creation process or later to update an existing integration.

In example embodiments, the system also affords the capability to create reports based on natural language queries as well as join data from multiple different integrated systems. Tableau, Appian, QlikView, IBM Cognos, Oracle BI, Sisense, Dundas and others make use of speech and low and no code interfaces and enable use of multiple application integration for visualization and business intelligence. Some of these applications have integrated speech analytics (e.g., Tableau formed a partnership with AI speech analytics company VoiceBase to provide call center analytics). However, Chatbot and Voice are not currently integrated to provide configuration or to integrate their applications. On the other hand, the platform according to example embodiments can integrate its multi-modality approach to integration so as to integrate these applications into the enterprise environment.

Figure 6:
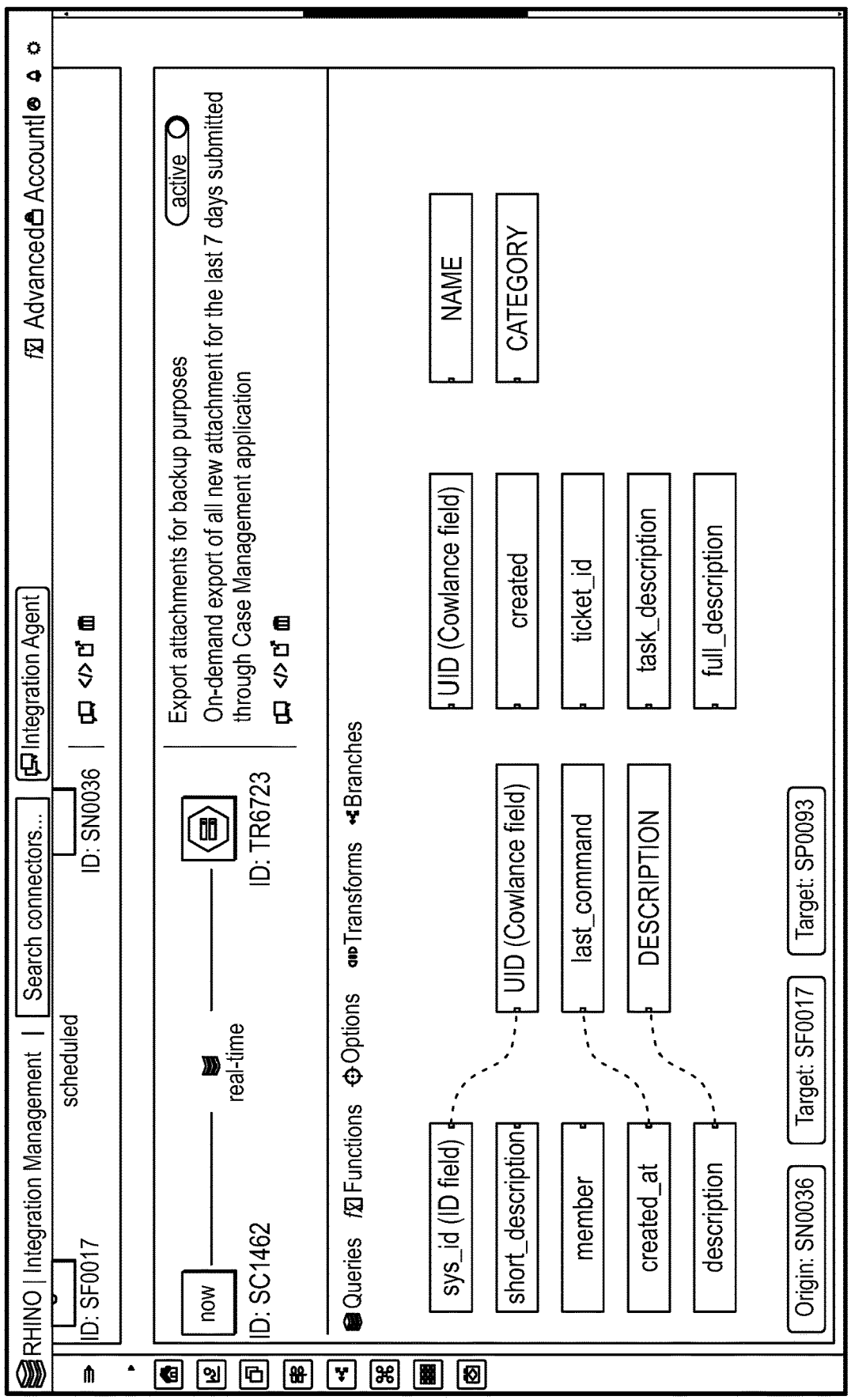
FIG. 6 is an illustration of mapped services, according to various example embodiments.

In example embodiments, the platform can also make use of meta-data regarding the person doing the integration to help inform appropriate use of vocabulary and to anticipate specific integration tasks that he/she may wish to perform. There is also the ability to examine integration history so as to inform the system if the integration is a "re-do" of a past integration versus a novel integration. There is also the ability to provide personalized NLP and intent/entity optimization based on individual ML profile which is optimized based on the individuals use, metadata and integration performance history. Example embodiments may also make use of hybrid Bots, which use menu-based methods and AI and Machine Learning based NLP methods at the right time to create a blended experience. Menu-based methods help to narrow down the branching decision trees to afford accurate mapping of user commands to actions. The use of full NLP can make use of a limited or predictive vocabulary that narrows the possible language 'matches' and increases accuracy of the NLP in the context of software integration. The bot may also recommend viable next actions to users, answer questions, and assist with auto completing forms. When needed, the bots can direct users to customer support agents to provide a seamless user experience. The platform according to example embodiments also provides an 'escalation' path to make use of natural language questions to the virtual developer, which may reach out to the integrated systems to attempt to formulate an answer. If it needs more specifics, it may prompt the user for them before responding. FIG. 6 is an illustration of mapped services, according to various example embodiments.

FIG. 8 is an illustration of transactions reporting between various systems, according to various example embodiments. For example, transactions reporting includes determining the amount of data being transmitted from one service to another after the integration between the two services is complete.

Figure 9:
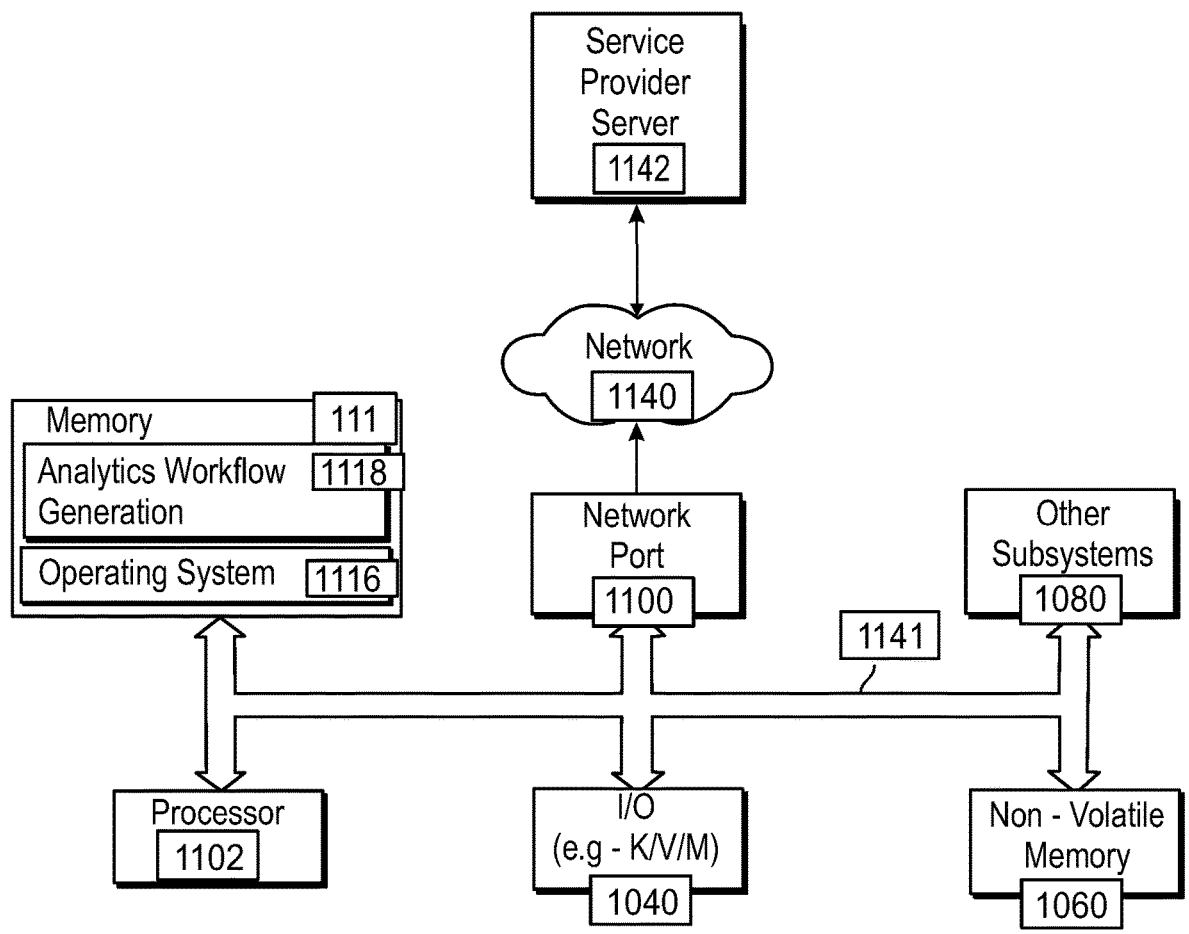
FIG. 9 is a diagram illustrating a general illustration of components of an information handling system.

FIG. 9 is a diagram illustrating a general illustration of components of an information handling system. FIG. 9 is a generalized illustration of an information handling system 100 that can be used to implement the system and method of the present invention. The information handling system 100 includes a processor (e.g., central processor unit or "CPU") 1102, input/output (I/O) devices 1040, such as a display, a keyboard, a mouse, and associated controllers, a hard drive or disk storage 1060, and various other subsystems 1080. In various embodiments, the information handling system 100 also includes network port 1100 operable to connect to a network 1140, which is likewise accessible by a service provider server 1142. The information handling system 100 likewise includes system memory 111, which is interconnected to the foregoing via one or more buses 1141. System memory 111 further comprises operating system (OS) 1116 and in various embodiments may also comprise an analytics workflow generation system 1118.

The analytics workflow generation system 1118 performs an analytics workflow generation operation. The analytics workflow generation operation enables generation of targeted analytics workflows created by one or more data scientists, i.e., experts in data modeling who are trained in and experienced in the application of mathematical, statistical, software and database engineering, and machine learning principles, as well as the algorithms, best practices, and approaches for solving data preparation, integration with database management systems as well as file systems and storage solutions, modeling, model evaluation, and model validation problems as they typically occur in real-world applications. These analytics workflows are then published to a workflow storage repository so that the targeted analytics workflows can be used by domain experts and self-service business end-users to solve specific classes of analytics operations.

More specifically, in certain embodiments, an analytics workflow generation system 1118 provides a user interface for data modelers and data scientists to generate parameterized analytic templates. In certain embodiments, the parameterized analytic templates include one or more of data preparation, data modeling, model evaluation, and model deployment steps specifically optimized for a particular domain and data sets of interest. For example, a particular business such as an insurance company may employ data-scientist-experts as well as internal citizen-data-scientist customers for those expert-data-scientists who may perform specific repeated data pre-processing and modeling tasks on typical data files and their specific esoteric data preparation and modeling requirements. Using the analytics workflow generation system 1118, a data scientist expert could publish templates to address specific business problems with typical data files for the customer (e.g., actuaries), and make the templates available to the customer to solve analytic problems specific to the customer, while shielding the customer from common data preparation as well as predictor and model selection tasks. In certain embodiments, the user interface to create analytic workflows is flexible to permit data scientists to select data management and analytical tools from a comprehensive palette, to parameterize analytic workflows, to provide the self-service business users the necessary flexibility to address the particular challenges and goals of their analyses, without having to understand data preparation and modeling tasks.

Next, in certain embodiments, the analytics workflow generation system 1118 provides self-service analytic user interfaces (such as web-based user interfaces) so that self-service users can choose the analytic workflow templates to solve their specific analytic problems. In certain embodiments, when providing the self-service analytic user interfaces, the system 118 analytics workflow generation accommodates role-based authentication so that particular groups of self-service users have access to the relevant templates to solve the analytic problems in their domain. In certain embodiments, the analytics workflow generation system 1118 allows self-service users to create defaults for parameterizations, and to configure certain aspects of the workflows as designed for (and allowed by) the data scientist creators of the workflows. In certain embodiments, the analytics workflow generation system 1118 allows self-service users to share their configurations with other self-service users in their group, to advance best-practices with respect to the particular analytic problems under consideration by the particular customer.

In certain embodiments, the analytics workflow generation system 1118 manages two facets of data modeling, a data scientist facet and a self-service end-user facet. More specifically, the data scientist facet allows experts (such as data scientist experts) to design data analysis flows for particular classes of problems. As and when needed experts define automation layers for resolving data quality issues, variable selection, best model or ensemble selection. This automation is applied behind the scenes when the citizen-data-scientist facet is used. The self-service end-user or citizen-data-scientist facet then enables the self-service end-users to work with the analytic flows and to apply specific parameterizations to solve their specific analytic problems in their domain.

Thus, the analytics workflow generation system 1118 enables high-quality predictive modeling by providing expert data scientists the ability to design "robots-that-design-robots," i.e., templates that solve specific classes of problems for domain expert citizen-data scientists in the field. Such an analytics workflow generation system 1118 is applicable to manufacturing, insurance, banking, and practically all customers of an analytics system 118 such as the Dell Statistica Enterprise Analytics System. It will be appreciated that certain analytics system can provide the architectures for role-based shared analytics. Such an analytics workflow generation system 1118 addresses the issue of simplifying and accelerating predictive modeling for citizen data scientists, without compromising the quality and transparency of the models. Additionally, such an analytics workflow generation system 1118 enables more effective use of data scientists by a particular customer.

Although the above description refers to retrieving targeted parameterized analytics template from the workflow storage repository, the retrieving being performed by an end-user associated with the customer to solve a specific analytics need of the customer, the platform according to example embodiments is configured to dynamically integrate services based on end-user programmatic instruction.

The following description of FIG. 10 below provides a more detailed discussion of an auto-recommender according to various examples.

Figure 10:
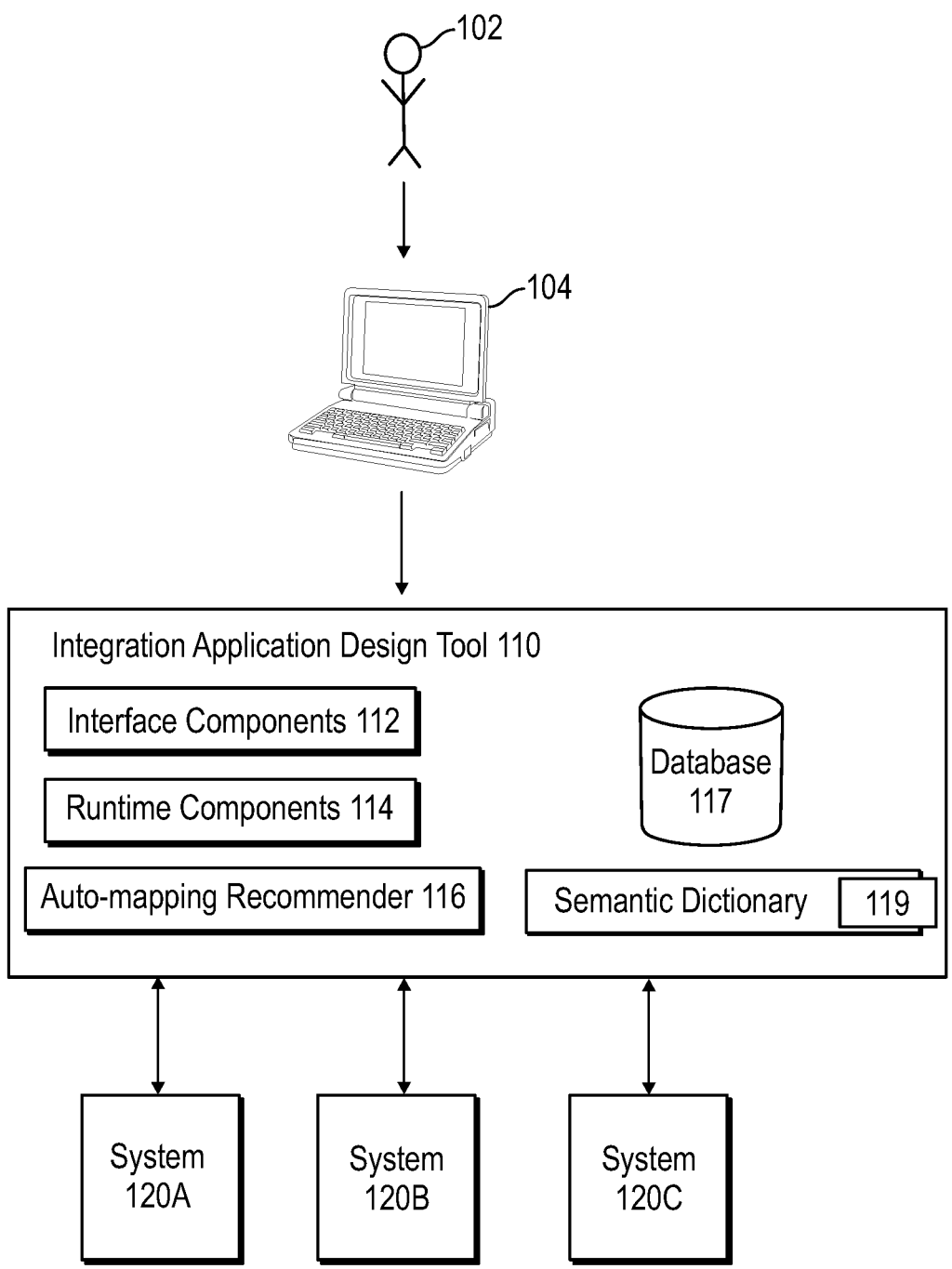
FIG. 10 is a block diagram of an environment including an integration flow design tool, according to example embodiments.

FIG. 10 is a block diagram of environment 100 including an integration flow design tool, according to some embodiments. Any operation herein may be performed by any type of structure in the diagram, such as a module or dedicated device, in hardware, software, or any combination thereof. Any block in the block diagram of FIG. 10 may be regarded as a module, apparatus, dedicated device, general-purpose processor, engine, state machine, application, functional element, or related technology capable of and configured to perform its corresponding operation(s) described herein. Environment 100 may include user 102, device 104, integration application design tool 110, and systems 120.

User 102 may be a developer or other individual designing, developing, and deploying integration flows using an integration application design tool in an integration platform. User 102 may be a member of a business, organization, or other suitable group. User 102 may be a human being, but user 102 may also be an artificial intelligence construct. User 102 may employ, i.e., connect to, a network or combination of networks including the Internet, a local area network (LAN), a wide area network (WAN), a wireless network, a cellular network, or various other types of networks as would be appreciated by a person of ordinary skill in the art.

Device 104 may be a personal digital assistant, desktop workstation, laptop or notebook computer, netbook, tablet, smart phone, mobile phone, smart watch or other wearable, appliance, part of the Internet-of-Things, and/or embedded system, to name a few non-limiting examples, or any combination thereof. Although device 104 is illustrated in the example of FIG. 10 as a single computer, one skilled in the art(s) will understand that device 104 may represent two or more computers in communication with one another. Therefore, it will also be appreciated that any two or more components of device 104 may similarly be executed using some or all of the two or more computers in communication with one another.

Integration application design tool 110 may allow user 102 to design integration applications that access, manipulate, and otherwise use disparate technical resources. Integration application design tool 110 may provide a graphical design environment so user 102 may build, edit, deploy, monitor, and maintain integration applications. Integration application design tool 110 may provide a drag-and-drop interface that allows user 102 to leverage pre-built assets, security protocols, APIs, programming languages, and other suitable components. Integration application design tool 110 may standardize access to various data sources, provide connections to third-party systems and data, and provide additional functionalities to further integrate data from a wide-array of organizational and on-the-cloud data sources. Integration application design tool 110 may include user interface components 112, runtime components 114, auto-mapping recommender 116, data 117, and semantic dictionary 119.

Integration application design tool 110 may allow user 102 to create an integration flow. Two examples of integration flows are provided below. These integration flows are merely exemplary, however, and one skilled in the relevant arts will appreciate that integration flows may perform a vast and expansive array of functions that may differ between individuals and among organizations. Some integration flows may incorporate dozens or even hundreds of assets into the integration scenario.

In one example of an integration flow, user 102 may build an integration scenario that synchronizes data between an enterprise resource planning (ERP) system and a customer relationship management (CRM) system. Such an integration scenario may receive information about a new customer from the CRM system and insert that information into the ERP system to ensure that the two systems stay in synchronization. In this scenario, user 102 may add an asset in integration application design tool 110 that connects to the CRM system and add a second asset in integration application design tool 110 to connect to the ERP system. The resultant integration application may then receive a set of fields from the CRM node and pass these fields via the connection to the ERP system to add the new customer data in the appropriate format and/or through a suitable API.

In a second example of an integration flow, user 102 may build a health and fitness integration application. A first asset in such an integration scenario may connect to a user's watch to retrieve data about the number of steps, e.g., from a pedometer, taken in a day by the watch wearer. In this example, a second asset may record this data into a database server stored on the cloud for record keeping and analytic generation. One skilled in the relevant arts will appreciate that the first asset may include a variety of accessible data fields that may or may not correspond to the data fields used and/or otherwise available within the second asset.

Integration application design tool 110 may further allow user 102 to map fields from a first asset (the source asset) to fields of a second asset (the target asset). In other words, a first asset may use data that may be passed through to a second asset, and user 102 may specify on a field-by-field basis the appropriate association. To continue the exemplary pedometer example described above, consider an exemplary schema representing the fields in the source asset (the watch with a pedometer): StepDate: smalldatetime; NumberOfSteps: int. The second asset (the cloud-stored database server), could include a database table represented with the exemplary schema: RelevantDate: date; StepsTaken: big int; TotalDistance: decimal User 102 may select an appropriate mapping between the first asset and the second asset. User 102 may configure StepDate to link to RelevantDate and NumberOfSteps to link to StepsTaken, with TotalDistance remaining unlinked. By configuring the integration flow thusly, when the integration application executes, it may initialize the fields in the target asset and populate their values using the relevant fields from the source asset.

As described above, for less trivial cases (e.g., where the assets have more than the above two or three fields), this may be an extremely time consuming endeavor for user 102. For such cases, integration application design tool 110 may provide an auto-mapping recommendation, described in further detail below.

User interface components 112 may be employed by integration application design tool 110 to provide components used by integration application design tool 110 to render a user interface for view by user 102 via device 104. User interface components 112 may include a JavaScript user interface library to control dynamic interactions between user 102 and integration application design tool 110. User interface components 112 may include a development toolkit facilitating the building of HTML5 or mobile applications. User interface components 112 may allow a business or organization to upgrade components used by integration application design tool 110 in order to change the experience for user 102 over time.

Runtime components 114 may allow an integration application created via integration application design tool 110 to function at runtime. In one embodiment, runtime components 114 may build, assemble, compile, or otherwise create executable object code based on the specified integration scenario. In another embodiment, runtime components 114 may create interpreted code to be parsed and applied upon execution. Runtime components 114 may connect to ancillary systems to retrieve, store, and manipulate data using an appropriate API or other method. Runtime components 114 may include a variety of intermediary hardware and/or software that runs and processes the output of integration flows.

Auto-mapping recommender 116 may be leveraged by integration application design tool 110 to provide a suggested linking between fields in a source asset and fields in a target asset, i.e. an auto-mapping recommendation. Auto-mapping recommender 116 may deploy a neural network to determine appropriate mappings between a field in a source asset (i.e., the input layer) and a field in a target asset (i.e., the output layer) using a hidden layer and associated weights. Auto-mapping recommender 116 may train the neural network to provide more accurate recommendations over time based on user provided feedback, for example, corrections made by a user to the recommendation, a user acceptance of the recommendation, or a user rejection of the recommendation.

Auto-mapping recommender 116 may suggest mappings to user 102 in a graphical representation. Such a graphical representation may demonstrate connections between the fields of one asset to the fields of the second asset with lines, arrows, or other visual connectors. Auto-mapping recommender 116 may further translate recommended mappings into a script in an expression or scripting language. Such translation is advantageous because user 102 may view an alternate, textual form of the recommendation and make modifications therein. Moreover, the script may subsequently be executed at runtime to link the source fields and target fields. Additionally, the script may be updated, either manually by user 102 or by auto-mapping recommender 116, to perform additional data transformations. For example, a smalldatetime field may be translated to a date field, a long integer transformed into a floating point number, etc.

Data 117 may be any of a panoply of data storage systems housing information relevant to, used in, and stored by integration application design tool 110 including information about designed integration scenarios, available assets for deployment, connections, a neural network employed by auto-mapping recommender 116, etc. For instance, data 117 may be a database management system or relational database tool. Data 117 may further be a message queue or stream processing platform such as Apache Kafka or Apache Spark or other data storage systems like Apache Hadoop, HDFS, or Amazon S3, to name just some examples. Data 117 may be a data lake, data silo, semi-structured data system (CSV, logs, xml, etc.), unstructured data system, binary data repository, or other suitable repository. Data 117 may store thousands, millions, billions, or trillions (or more) of objects, rows, transactions, records, files, logs, etc. while allowing for the creation, modification, retrieval, archival, and management of this data. In an embodiment, data 117 uses scalable, distributed computing to efficiently catalog, sort, manipulate, and access stored data.

Semantic dictionary 119 may be used by auto-mapping recommender 116 and/or integration application design tool 110 to determine relationships between fields within source assets and the target assets. In one embodiment, semantic dictionary 119 may map words to other words exhibiting similar meaning. For example, a field name of "UserName" may be mapped in semantic dictionary 119 to a field name of "LoginName." Thus, semantic dictionary 119 may allow auto-mapping recommender 116 to identify matches among fields in a manner exceeding mere syntactic equivalence. Semantic dictionary 119 may further include a linguistic corpus or additional annotations used to link field names between assets and to derive meaning from and make connections between the fields and across disparate assets.

Systems 120, such as system 120A, system 120B, and system 120C, may be an API, data source or other technical resource or system to be included in an integration flow. Systems 120 may house data in a number of fashions, such as in a suitable data repository, either in a raw form or following (or at an intermediate step within) the application of a transformational capability. Systems 120 may include data lakes, data silos, message streams, relational databases, semi-structured data (CSV, logs, xml, etc.), unstructured data, binary data (images, audio, video, etc.), or other suitable data types in appropriate repositories, both on-premises and on the cloud. Just for example, systems 120 may provide data or functionalities by connecting to a CRM system, an ERP system, a database, an internet-Of-Things device, a mobile phone, a watch, a JIRA task list, a revision control system or other code management tool, and/or a multitude of other sources.

In example embodiments, a bot may assist users with their integration development. In example embodiments, a user may be able to communicate to the both in natural language and/or low- or no-code development environments as well as to ask status of the integration involving a specific component of the enterprise software or other queries of the specific integration or the global systemic ramifications thereof. In example embodiments, a bot may identify the intent and redirect the user to the proper page. For example, if the bot determines the intent is to "create an integration," the bot may redirect the user to the integration creation page. In example embodiments, the bot identifies parameters and automatically fill out data. For example, if a user says they want to build a "real time bidirectional" integration, the bot may automatically fill out the frequency and bidirectional fields on the integration form with the relevant values as discussed above with respect to FIGS. 5A-5D. In example embodiments, the bot may answer user questions about the meaning of questions or user inputs. For example, a user may ask what a bidirectional integration is, and the virtual developer may reply with an explanation.

Recommendation Engine: In example embodiments, a recommendation engine learns user behaviors and recommend next actions. Users are able to select these actions and be appropriately redirected. In example embodiments, when a user begins typing a value the system may automatically complete the text provided the model is sufficiently confident. In example embodiments, when brought to a form, the recommendation system may automatically populate values with best guesses provided the model is sufficiently confident. The recommendation may provide helpful links and documents for a given task when appropriate. This may assist the user in the development process with additional context.

Example embodiments include methods and systems for multi-modalities integration, i.e., unidirectional and bidirectional via any one or more of speech, chatbot, low code, and no code enterprise integration.

Over the past few decades, computer interfaces have continuously improved from text-based terminals to clunky desktop applications, and finally to responsive modern user interfaces (UIs). With the rise of machine learning and natural language processing, a new option has appeared as well, the new option being the conversational UI. With conversational UI, users communicate with a bot or computer program which guides users through a series of questions via natural language. Predecessors of conversational UI were effectively just primitive chat bots. Responses to questions needed to be stated according to rigid guidelines or else the computer would not process the request. With modern machine learning, it is far easier for computers to identify user intents from speech or text. This is essential for smooth UI due to the variety of human language.

Intent extraction is part of modern natural language processing and is particularly well-suited to the domain of software integration. This is because there are generally only a few things that need to be known to build a software integration: i) the source of the data (defects in Jira, table in ServiceNow, SQL column, etc.), ii) the target for the data (SQL database, a CRM system, etc.), the event in question in the source system (A bug was filed, a record was created, etc.), iii) the action that may be taken in the target system (Update a record, send an email, etc.), and iv) how often may the data move (real-time, hourly, daily, etc.).

With the answers to these questions, example embodiments build numerous integrations, robotic process automations, and business workflows. An example of this would be an integration to move incidents from ServiceNow to Jira. A user may say "I would like to open a bug in Jira for each urgent incident in ServiceNow in real time." By doing so, a conversational agent may be configured to extract the source, target, event, action, and frequency of the integration, and set it up for the end user. In example embodiments, the source is ServiceNow, the target is Jira, the event is the "urgent incident," the action is to open a bug, and the frequency is in real time.

In example embodiments, there may be more to building an integration than these five data points, and almost everything besides answering these questions can be handled by the system automatically. Once these answers are known, the software can automatically set up and deploy integrations to move the appropriate data. Likewise, additional software to monitor this integration for i) performance, iii) data integrity, and iii) data synchronization may also be automatically constructed and deployed.

Using Machine Language (ML) and Conversational ML in Integrations

Example embodiments of the systems and methods include making use of language to enable integration without deep technical knowledge that is usually needed to effect enterprise software integrations. Natural language processing enables the ability to move from speech to text-based conversion. In addition, higher level language understanding is needed to enable useful dialog between natural language commands and the integration efforts. In order to effect these changes, the platform according to example embodiments makes use of intent and entity extraction and utilization.

Example embodiments make of intent-based ML to facilitate software integrations and hyperautomation. An intent represents the purpose of a user's input. Example embodiments include a platform to map an intent for each type of user request to the API and applications supported. Coupling entity extraction in the natural language processing (NLP) of the invention enables a term or object that is relevant to your intents and that provides a specific context for an intent. In the platform according to example embodiments, example intents include adding connected systems and building or modifying integrations. The natural language interface can also be extended to allow users to query their data in addition to building integrations for their data. The ML used by the platform according to example embodiments makes use of an ensemble of deep neural networks and decision/dialogue tree models. At runtime, both the rules based decision tree and ML methods may be used simultaneously or contemporaneously, and a confidence score may be calculated for each based on previous user experiences. Whichever method returns a higher confidence may be used to select the appropriate response to the end user. In certain cases, the range of allowable responses may be so narrow that ML may not need to be used at all, and decision trees may be configured to provide the full suite of functionality.

Example embodiments can also enable mapping of intent to entities that may be pre-defined in the platform either by manual coding or by automated discovery or application programming interface (API) discovery process that can automatically map the functionality of the API along with the possible functional manipulations which are possible with given entities. The intent-matching step is the initial "fuzzy" step, where the bot attempts to understand what the user is trying to do in general. Example intents include adding connected systems and building or modifying integrations. Each intent may have a desired or predetermined parameters associated therewith, which the bot attempts to identify by prompting the user(s) for the specific values of each parameter (slot filling). When possible, machine learning is used during slot filling to avoid a user having to memorize specific terms or vocabulary. If the parameters are expressed in the initial intent, the bot may be configured to directly extract them and avoid the need for additional prompts. For example, a user may state they want to build an integration and also detail many of the specifics of that integration in a single utterance.

A greater discussion on machine language is discussed herein. Machine language systems and methods for building software applications may include a knowledge base, an application scenario player, a service connector, presentation components, and underlying system component-services. In example embodiments, instead of using "almost natural language," users can communicate directly in natural language with the platform. In example embodiments, the integration and use of speech affords the opportunity for the speech to interact simultaneously or contemporaneously with integrations and a systematic, orchestrated integration service that can contain dedicated code both on a macro level, i.e., for all systems involved via, for example, the cloud, as well as the individual enterprise software level and on-premise level. Furthermore, the system affords a dynamic query capability of all of these systems for question and answer and escalation of these questions to a ticketed system to enable human intervention if and when needed. Example embodiments create an agnostic speech interface for inclusion of different third-party, and/or more specialized bots, as well as integration of different code or low-code systems. Example embodiments provide added flexibility due to the use of speech to interrogate the actual end-user data itself and its ability to work with a wide range of application APIs that can be auto-discovered and exposed to the speech/bot interface. In example embodiments, the controlled vocabulary and use of ML allows to refine the relationship between intent and entity extraction on an aggregate basis, e.g. to optimize both a single tenant system or globally using these insights across all systems, as well as enhance individual profiles by learning from integration success and proxies for success, sentiment analysis of communications and human-based training and audit review.

In example embodiments, technology which can be utilized in the platform according to example embodiments may include, e.g., Google Dialogflow. Dialogflow is an end-to-end, "build-once deploy-everywhere" development suite for creating conversational interfaces for websites, mobile applications, popular messaging platforms, and IoT devices.

Predictive analytics to optimize integrations—Example embodiments include the use of algorithmic and predictive integration to enable systematic integration. While the programmatic features of the system afford the ability to directly integrate using the APIs of the various enterprise software systems, there is also the opportunity to make use of the software driven integration platform that the invention can enable. Example embodiments provides a software-based integration platform that both contains a rule-based integration decision tree which can provide higher likelihood of successful integrations without violation of methods and connectivity which result in invalid data flow as well as systematic methods of monitoring for software error 'codes' from either the enterprise software or the inventive integrative platform. In addition, the platform can perform tests to validate proper data integration as well as running preventive and workflow diagnostics to provide use case and test case based testing.

In example embodiments, predictive analytics can be provided that adapts and optimizes changes in when updates or changes occur in one system, integration changes are automatically adjusted to accommodate these changes without need for human intervention. Such predictive analytics can be a combination of a hierarchical rule-based system and/or machine learning system that affords insights that can be either directly translated into integration changes or offered to the end-user as recommendations or alerts to consider before or after making a change in the integration.

System Awareness through the use of Domain Specific Chatbots—Alternatively, the platform can make use of specialized Chatbots that have domain specific language and algorithms that are specific for particular tasks and/or particular enterprise systems.

Recommendations and demonstration of different code paths—Example embodiments may learn from the selected option selections as well as feedback from the system (including violation notices, analytics, measures of data integrity) to better recommend these suggestions to individual users and organizations. This capability is aimed to provide many of the fields entered and options selected in the system.

The platform according to example embodiments also makes use of macro information, meta-data and other data sourcing (including aggregate user data, single tenant specific and end-user data) in creating recommendations. Example embodiments can also effectively create a hierarchy of chatbots in at least the following ways:

1. Integrating with external chatbots: Integrated systems may contain chatbots or be chatbot systems, in which case the platform can redirect users to specific chatbots when appropriate based on the user's context.
2. Exposing APIs as chatbots: The system may be configured to expose discovered APIs as chatbots. For any given API, there is a set of required and optional fields. When combined with the context of the purpose of each API, the platform may be configured to generate a unique chat experience for each connected API, even if those APIs do not normally have chatbots associated with them.
3. Custom Bots: End users may be able to create custom bots using the low/no-code and conversational interfaces by creating questions, intents, and slots. The system may be configured to forward user from bot to bot as needed, combining all of their capabilities to enrich the user experience.

Extracting Analytics Workflows using Conversational artificial intelligence (AI)—The platform according to example embodiments can also provide bi-directional insights/communication through automated testing, recommendations and other data that is informed by system status and analysis of meta-data that is generated from the platform according to example embodiments and the enterprise use. The platform, according to example embodiments, is also configured to show analytics workflows both of the platform itself as well as the constituent enterprise software packages that make up the integrated system of an organization.

The platform according to example embodiments can also serve to provide the following functionality: i) Automated testing of workflows and end-point confirmation analysis; ii) Performance monitoring and data synchronization; iii) Field level mapping recommendations—based on prior integrations, integration logic, feedback from customers on integration success—based on pre-programmed intent-based logic, taxonomy and rule-based algorithms; iv) Q&A for common user questions.

In example embodiments, smart integration may include automatically performed tasks, or tasks performed based on a given environment such as, e.g., automatically updating workflows and automatically updating various services such as email and the like.

In example embodiments, the system may learn from the selected options to better recommend them to individual users and organizations. This may be the case for the majority of fields entered and options selected in the system.

Permissions and Recommendations: Different users of a given instance of the system can have different permissions. For example, platform owners may choose to let all users be able to integrate with ServiceNow, but only let some integrate with S3. In addition, the recommendation engine is configured to learn individual user and organizational behavior to power recommendations. Block-chain is configured to record in a ledger the different permissions and individual integrations of each user in the system.

In example embodiments, updates to the platform, or other platform changes, may be performed inside the connected systems. In embodiments, applications can be built inside connected services using a dialog box such as discussed above with respect to FIGS. 5A-5D. For example, the method may include building a ServiceNow application inside of a connected ServiceNow service. The following is a greater discussion on workflow generation.

Figure 11:
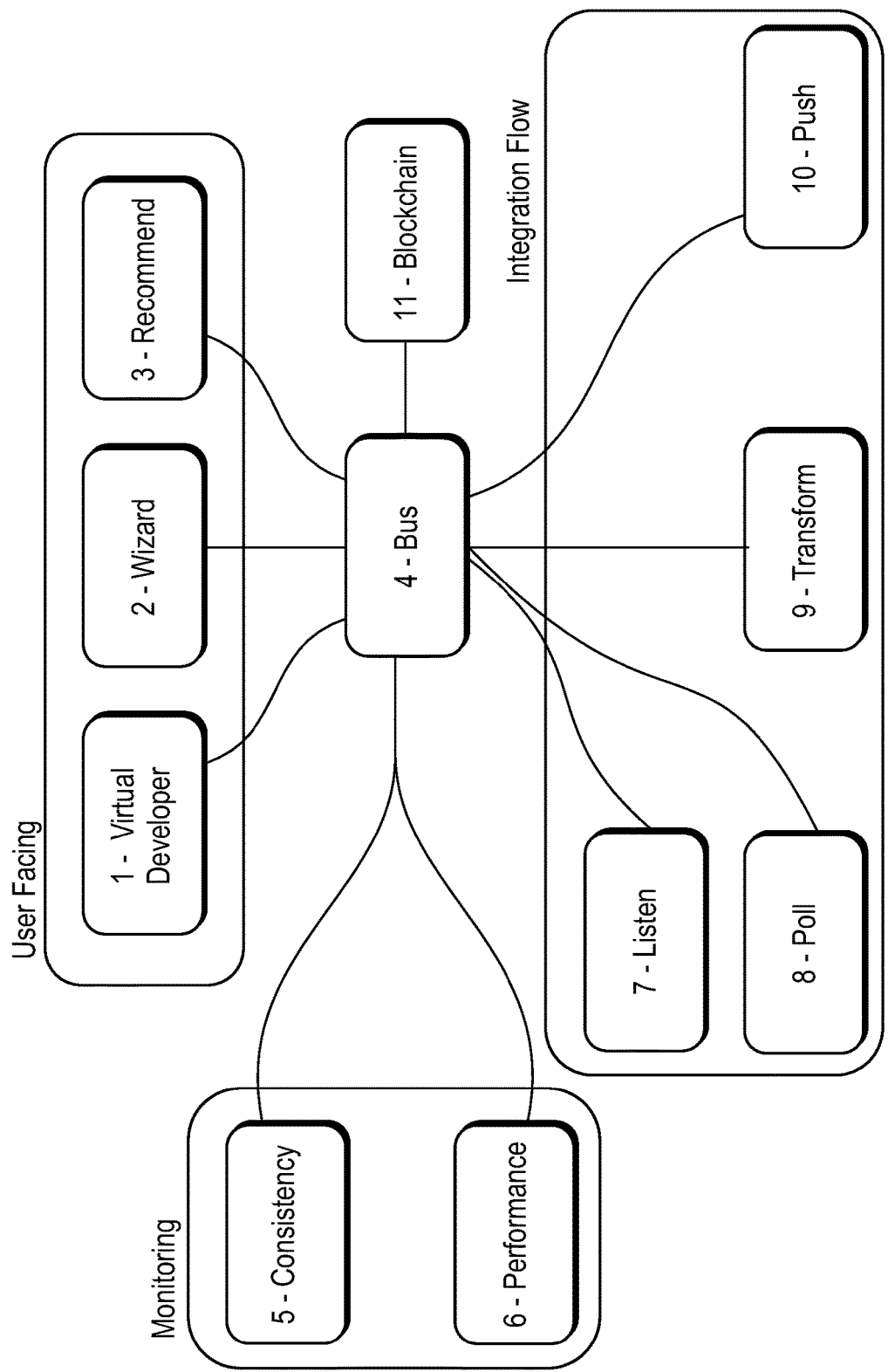
FIG. 11 is a diagram illustrating operation of integrated services according to various example embodiments.

FIG. 11 is a diagram illustrating operation of integrated services according to various example embodiments. The services according to various example embodiments may be described in belonging to three (3) categories: 1) User-Facing services, 2) Monitoring services, and 3) Integration services.

In example embodiments, the User-Facing services include a Virtual Developer 1, a Wizard 2 and a Recommender 3 all connected via a Bus 4. The Virtual Developer 1 includes a ML- and AI-powered NLP bot configured to answer user questions, fill out forms, and build integrations and bots on behalf of the users. The Virtual Developer 1 may respond to user requests and may automatically configure records according to the user's natural language requests. In example embodiments, the Wizard 2, or low-code integration builder service, may be leveraged by end users to construct new integrations and robotic process automations (RPAs). The Wizard 2 may include a serverless front end and an operational data store, and may store configurations made by users through either the Virtual Developer 1 or the low-code interfaces. In example embodiments, the Recommender 3 is configured to observe user behavior and to recommend appropriate next actions leveraging deep learning technologies. The Recommender 3 may leverage sentiment analysis to ensure that users are having an optimal experience. The Recommender 3 may reach out to multiple different NLP services in order to obtain the most accurate predictions for any scenario. The Virtual Developer 1, Wizard 2, and Recommender 3 may all share information to stay in sync with respect to user inputs.

In example embodiments, the Bus 4, or Event Bus 4, is configured to organize traffic between the different services, i.e., between the User-Facing services, the Monitoring services, and the Integration services.

In example embodiments, the Monitoring services include a Data Integrity service 5 and a Performance Monitoring service 6. In embodiments, the Data Integrity service 5 may periodically check systems for anomalous updates, and may handle them appropriately. Users may be able to choose to let the errors be auto-corrected, or to manually handle the errors. The Data Integrity service 5 may also notify end users of any issues that may arise with respect to the integrity of the data. In embodiments, the Performance Monitoring service 6 may monitor transactions to identify increases in latency or system crashes. Once these issues are identified, the Performance Monitoring service 6 may alert other services to, e.g., slow down in order to preserve performance. Should the latency vanish, the Performance Monitoring service 6 may alert other services that it is safe to continue operation at normal loads. In the event of external system crashes, the Performance Monitoring service 6 may alert other systems to temporarily pause their attempts to communicate with the crashed system until it is safe to restart them.

In example embodiments, the Integration services include a Listening service 7 configured to monitor traffic for incoming events. Depending on which integration they want the data to initiate, different endpoints may be flagged on the Listening service 7. In embodiments, the Integration services may include a Polling service 8 configured to regularly check external systems for updates and events. The Polling service 8 may achieve this by starting multiple processes to make the appropriate request types, such as rest, soap, or Java Database Connectivity (JDBC). In embodiments, the Integration services may include a Transformation service 9 configured to transform event data to be suitable for a user's desired action. The transformation process is handled by the Transformation service 9, which is configured to convert files from one type to another according to the mapping logic automatically configured by the system or manually configured by the user. In embodiments, the Integration services may also include a Pushing service 10 which, once data is ready to be sent, makes requests to external systems to perform the actions specified by the relevant integrations. This is accomplished, in example embodiments, through multiple parallel processes configured to make the appropriate request types to external systems.

In example embodiments, the User-Facing services, the Monitoring services, and the Integration services may be connected to a Blockchain Ledger 11, where transactions from the Integration services discussed above may be persisted to the Blockchain Ledger 11 to provide a distributed transaction storage. Such persistence may provide a higher degree of immutability and may allow end users to control their data. A description of the flow of the above services is provided below with respect to FIGS. 12A-12B.

Figure 12A:
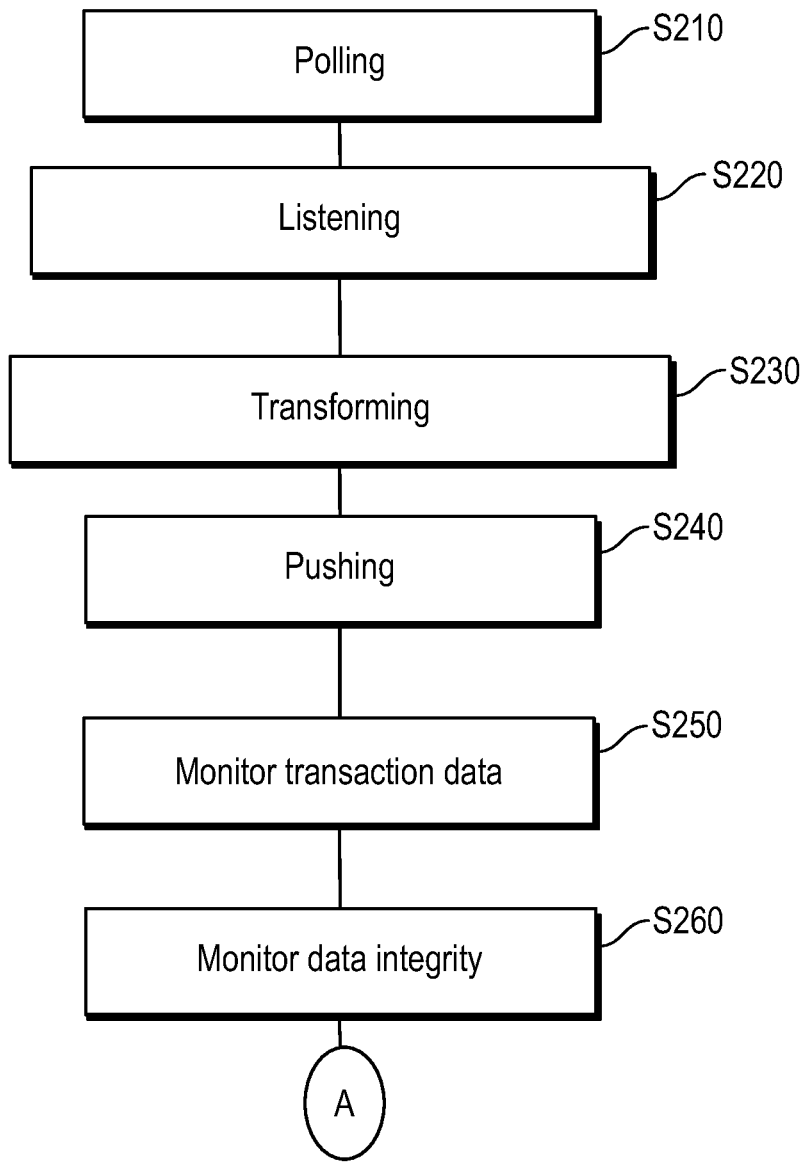
FIGS. 12A-12B are flowcharts describing a plurality of services performed as part of an integration process, according to various example embodiments.
Figure 12B:
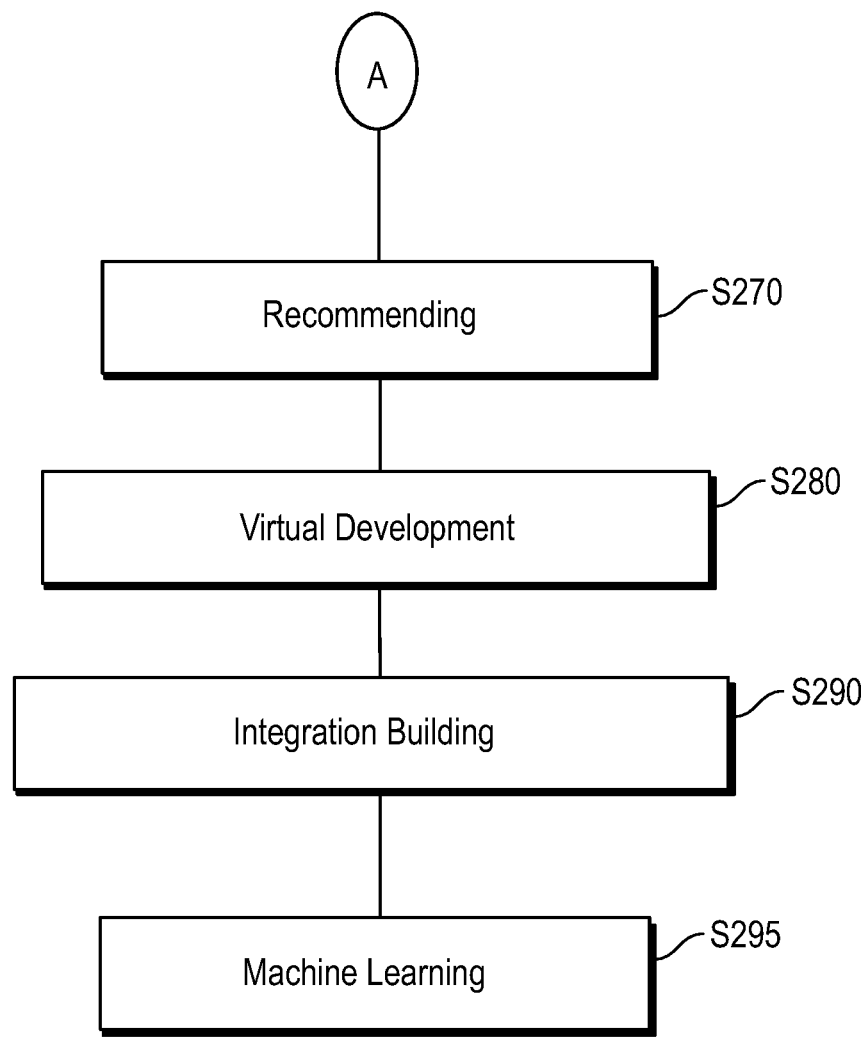

FIGS. 12A-12B are flowcharts describing a plurality of services performed as part of an integration process, according to various example embodiments. In FIG. 12A, the method may perform polling at step S210. In example embodiments, the polling service may regularly check external systems for updates and events. The method may also perform listening at step S220. In example embodiments, some systems, such as those using webhooks, may choose to push events instead of have them polled. For these systems, a listening service is installed which monitors traffic for incoming events. The method may further perform transforming at step S230. In example embodiments, the event data may be transformed to be suitable for the action. This transformation process is handled by a transformation microservice.

In FIG. 12A, the method may perform pushing at step S240. Once data is ready to send, a pushing microservice makes requests to external systems to perform the actions specified by the relevant integrations. The method may also monitor performance at step S250. In example embodiments, a performance monitoring service watches transactions to identify increases in latency or system crashes. Once identified, the service alerts other services to slow down in order to preserve performance. If the latency vanish, the service may alert others that it is safe to continue at normal loads. The method may further monitor data integrity at step S260. In example embodiments, a data integrity service may periodically check systems for anomalous updates and handle them appropriately. Users are able to choose to let the errors be auto corrected or manually handled. In addition, the system may notify end users of issues.

In FIG. 12B, the method may perform recommendations at step S270. In example embodiments, a recommendation service may observe use behavior and recommend appropriate next actions leveraging deep learning technologies. The recommendation service may leverage sentiment analysis to ensure users are having an optimal experience. The method may also perform virtual development at step S280. In example embodiments, a bot responds to user requests and automatically configure records according to the users' natural language requests. The method may further perform integration building at step S290. In example embodiments, the integration builder service is leveraged by end users to construct new integrations out of connected systems, events, and actions. The method may also use machine learning at step S295. In example embodiments, the system may host its own machine learning algorithms to power the recommendation engine and virtual developer and also reach out to external machine learning commodities to enhance performance. In example embodiments, through the event log and immutable blockchain ledger, the system may also be configured to service as a source of truth for audits and data integrity purposes. In example embodiments, through the previously detailed data integrity and performance monitoring services, the system may be configured to identify and correct performance and data issues as they occur, eliminating the need for manual intervention. In example embodiments, for security purposes, the system may be single tenant and multi instance. Each customer may have their own version of the system to use, which contains their own data.

Figure 13:
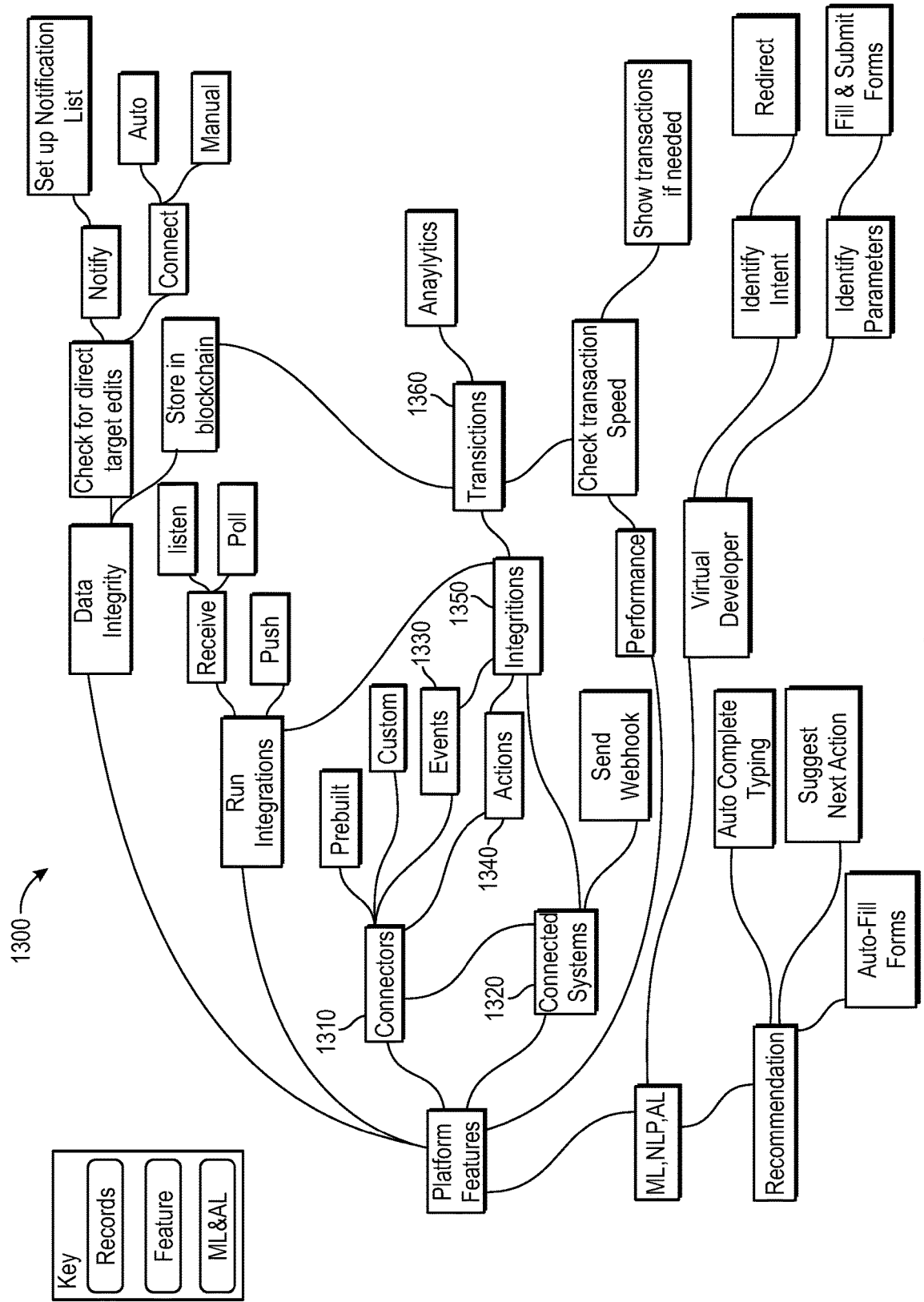
FIG. 13 is an illustration of a platform for software integration in accordance with example embodiments.

FIG. 13 is an illustration of a platform for software integration in accordance with example embodiments. In example embodiments, the platform 1300 includes connectors 1310. In example embodiments, the connectors 1310 may be prebuilt bundles of software configured to facilitate integrations with a specific system, bot, or application. For example, the system may have ServiceNow connectors, Jira connectors, MySQL connectors, and the like. In embodiments the system may support both pre-built and custom connectors. Each connector may be configured to be associated to events and actions. In example embodiments, the platform 1300 also includes connected systems 1320. In example embodiments, the connected systems 1320 may include instances of individual connectors. For example, the platform 1300 may use a MySQL connector to integrate with three (3) different databases. In this example, the users can choose if each connected system will monitor the same events/actions or different ones. In embodiments, each of the connections would constitute a separate connected system 1320. In embodiments, to create a connected system 1320, users may enter the details required to locate the platform 1300 (such as its URL), as well as any required authentication details. In example embodiments, the platform 1300 may further include events 1330.

In example embodiments, the events 1330 may include events that happen in external systems and that cause integrations to start, such as, e.g., the updating of a record, or the sending of an email. In example embodiments, the platform 1300 may include actions 1340. In example embodiments, the actions 1340 may include action items that should be performed in connected systems, such as, e.g., creating records, or modifying user profiles. In example embodiments, the platform 1300 may further include integrations 1350. In example embodiments, the integrations 1350 may include combinations of events and actions. In embodiments, each integration may or include as a sentence with, e.g., the following structure: When EVENT happens, perform ACTION. For example, when User updates a record in Jira, update it in ServiceNow. More complex integrations may be created by combining multiple events and actions together. In example embodiments, the platform 1300 may further include transactions 1360. In example embodiments, the transactions 1360 may include data changes that move through the integration platform between e.g., connected services. In embodiments, a transaction may be a created user, a sent email, or an updated record. Reporting and analytics may be available for transactions, and may be stored in blockchain ledgers.

Figure 14:
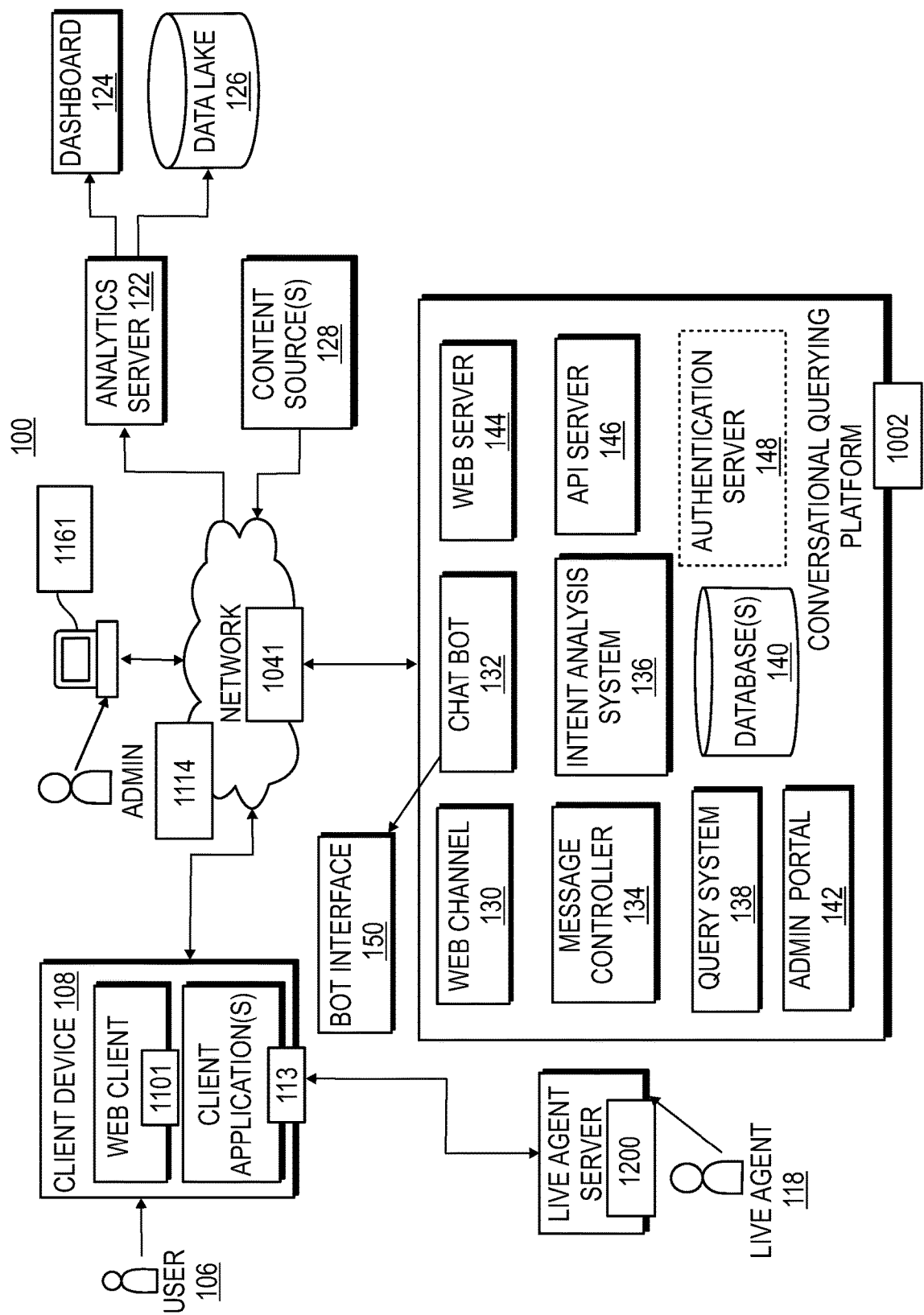
FIG. 14 is a functional block diagram of an example network architecture including an example artificial intelligence (AI)-based conversational querying (CQ) platform, according to example embodiments.

FIG. 14 is a functional block diagram of an example network architecture including an example artificial intelligence (AI)-based conversational querying (CQ) platform, according to example embodiments. FIG. 14 is a functional block diagram illustrating example network architecture 100 configured to provide querying of one or more content sources 128 via an automated interactive conversational environment, according to example embodiments. Network architecture 100 may include conversational querying (CQ) platform 1002, client device 108 associated with user 106, administrator console 1161 associated with administrator (admin) 1114, at least one live agent server 1200 associated with live agent 118, analytics server 122 and one or more content sources 128. Each of CQ platform 1002, client device 108, administrator console 1161, live agent server 1200, analytics server 122 and content source(s) 128 may comprise one or more computing devices, including a non-transitory memory storing computer-readable instructions executable by a processing device to perform the functions described herein.

Although the description herein describes network architecture 100 having one client device 108 and one administrator console 1161, in some examples, network architecture 100 may include one or more client devices 108 and/or may include one or more administrator consoles 116. Moreover, although the description herein describes network architecture 100 having one live agent 118 in communication with one live agent server 1200, in some examples, network architecture 100 may include one or more live agents 118 and/or one or more live agent servers 120. In some examples, live agent 118 may communicate with live agent server 1200 directly. In some examples, live agent 118 may communicate with live agent server 1200 via a separate computing device (not shown), such as a desktop computer, a laptop, a smartphone, tablet, a live agent console device or any other computing device known in the art that is configured to communicate with live agent server 1200 and client device 108.

CQ platform 1002, client device 108, administrator console 1161, live agent server 1200, analytics server 122 and content source(s) 128 may be communicatively coupled via at least one network 1041. Network 1041 may include, for example, a private network (e.g., a local area network (LAN), a wide area network (WAN), intranet, etc.) and/or a public network (e.g., the internet). In general, CQ platform 1002 may provide server-side functionality via network 1041 to user 106 associated with client device 108.

Client device 108 may comprise, without being limited to, a desktop computer, a laptop, a notebook computer, a smartphone, a mobile phone, a tablet, a portable digital assistant (PDA), a multi-processor system, a microprocessor-based or programmable consumer electronic device, or any other communication device that user 106 may utilize to interact with CQ platform 1002, content source(s) 128 and live agent server 1200. User 106 may interact with client device 108, for example, via a graphical user interface (not shown) displayed on any type of display device including, without being limited to a computer monitor, a smart-phone or mobile phone screen, tablet, a laptop screen, a consumer device screen or any other device providing information to user 106. In general, client device 108 may include any suitable user interface, user input component(s), output component(s), and communication component(s) for interaction with CQ platform 1002, live agent server 1200 and websites having one or more web pages (including, in some examples, websites among content source(s) 128).

Client device 108 may include web client 1101 (e.g., a browser, such as the Internet Explorer™ browser developed by Microsoft™ Corporation and one or more Client applications 113. Client applications 113 may include a web browser, a messaging application, electronic mail (email) application, and the like.

While the client-server-based network architecture 100 shown in FIG. 14 employs a client-server architecture, the present disclosure is of course not limited to such an architecture, and could equally well find application in a distributed, peer-to-peer, architecture system, or any other networked environment. Further, in some examples, the network architecture 100 may be deployed using a virtual private cloud including, for example, frontend sever(s), backend server(s), and database server(s) in the cloud.

Administrator console 1161 may comprise, without being limited to, a desktop computer, a laptop, a notebook computer, a smartphone, a mobile phone, a tablet, a portable digital assistant (PDA), a multi-processor system, a microprocessor-based or programmable consumer electronic device, or any other communication device that administrator 1114 may utilize to interact with CQ platform 1002 and analytics server 122. Administrator 1114 may interact with administrator console 1161, via a graphical user interface (not shown) displayed on any type of display device. Administrator 1114, via administrator console 1161, may be configured to interact with intent analysis system 136 of CQ platform 1002, such as for training of intent analysis system 136. Administrator 1114, via administrator console 1161, may also be configured to interact with analytics server 122, such as for analysis of the performance of CQ platform 1002 with various users.

Live agent server 1200 may be configured to communicatively connect user 106 associated with client device 108 with live agent 118, for human interaction with live agent 118 via a live chat. In general, live agent server 1200 may receive a request from CQ platform 1002 to initiate a live chat between user 106 of client device 108 and a live agent among live agent(s) 118 associated with live agent server 1200. The request for a live chat may include user information (e.g., user name, email address, internet protocol (IP) address, etc.), information regarding a type of service requested for the live chat (e.g., service related to an account, purchasing, pending orders, technical questions, etc.) and a history of automated conversational querying between user 106 and CQ platform 1002. In some examples, the type of service requested may be associated with different agents 118. For example, an account type service may be assigned to a first live agent (such as a customer support expert) and a technical question service may be assigned to a different, second live agent (such as a technical support expert). Live agent server 1200 may identify a suitable live agent 118 based on the information received in the request for live chat from CQ platform 1002, and may initiate connection between the selected live agent 118 and client device 108.

As discussed further below, chat bot 132 of CQ platform 1002 may generate an instance of a chat bot interface 150 on one or more websites displayed on client device 108 (e.g., via web client 1101). Chat bot interface 150 (also referred to herein as bot interface 150) may include an option for user 106 to request to chat with live agent 118 (e.g., by selecting a 'Contact Support' option in a selectable menu on chat bot interface 150). Chat bot interface 150 may allow user 106 to contact live agent 118 directly without navigating to any other applications, web pages or websites. In some examples, CQ platform 1002 may automatically suggest contact with live agent 118, through chat bot interface 150, based upon user input during automated conversational querying and/or through monitoring user actions on website(s). For example, chat bot interface 150 may provide a contact support option when a query asked by user 106 is unable to be answered by CQ platform 1002 or answered with a confidence below a predetermined threshold. Responsive to user selection of a live chat option (via chat bot interface 150), CQ platform 1002 may generate and send a request to initiate a live chat to live agent server 1200.

In addition to initiating a connection between live agent 118 and client device 108, live agent server 1200 may be configured to generate a live agent console display for the selected live agent 118 (e.g., on live agent server 1200 or on a computing device connected to live agent server 1200). Live agent console display 1500 may be configured to display information related to the user (including information in the received request), generally illustrated as user information region 1502. Live agent console display 1500 may also provide live agent 118 the ability to access to additional information from among content source(s) 128 for responding to user 106. Live agent console display 1500 may also provide an interface for live agent to chat with user 106, generally illustrated as chat area 1504. In general, a live agent console display may provide suitable information and data in one or more interactive windows to allow live agent 118 to communicate and provide information to user 106.

Live agent server 1200 may also be configured to provide the live chat between live agent 118 and client device 1101 via chat bot 132, through chat bot interface 150. Thus, upon user selection of a live chat option (by user 106) and selection of live agent 118 (via live agent server 1200), chat bot interface 150 may display the available (selected) agent, and user 106 may start chatting with live agent 118 through chat bot interface 150. In some examples, live agent 118 may transfer the live chat to a different live agent, for example, via live agent console display 1500. For example, the first live agent 118 may be a customer service expert, and may determine that user 106 has a technical question that may be better answered by a second live agent that is a technical service expert. The first live agent may contact the second live agent via live agent server 1200, transfer information associated with the user during the live chat (e.g., information displayed on live agent console display 1500) to the second live agent, and transfer the connection to client device 108 from the first live agent to the second live agent.

Because the live chat is provided via chat bot 132 of CQ platform 1002, CQ platform 1002 may continue to monitor user communications and update its records during the live chat. Such monitoring may allow CQ platform 1002 to update its algorithms for automated conversational querying, to reduce instances of handoff to live agent server 1200. Such monitoring may also allow CQ platform 1002 to provide a seamless transition from the live chat with live agent 118 to automated conversation with internet 132.

In a non-limiting example embodiment, CQ platform 1002 may be configured to communicate with live agent server 1200 using one or more rest application program interfaces (APIs). In some examples, rest API(s) may be exposed by live agent server 1200 to check for agent availability, to start and end a live chat, to send and receive messages, etc. In some examples, CQ platform 1002 may use a live chat application, including a cloud-based application.

Analytics server 122 may be configured to receive data collected by CQ platform 1002 (e.g., user input, user request data, response data generated by CQ platform 1002, conversation details of automated conversations with chat bot 132, live chat with live agent 118), and may generate one or more metrics based on the received data. Analytics server 122 may include dashboard 124 configured to display generated metrics and data lake 126 for storing the received data.

Data lake 126 may be configured to store, for example, information and data collected from CQ platform 1002 relating to automated chats (i.e., via chat bot 132) and live agent chats (i.e., via live agent 118). The information may include, for example, conversational details (e.g., one or more user inputs, one or more user intents identified by CQ platform 1002, one or more query results obtained by CQ platform 1002) over one or more automated conversations and/or live chats with one or more users. In some examples, the collected information may also include user actions on one or more websites during automated and/or live chat conversations. The collected information may also include, in some examples, feedback from user 106 (received, e.g., via client device 108 and/or via chat bot 132) relating to CQ platform 1002. In some examples, the collected information may also include messages from client device 108 directed to live agent server 1200. In general, data lake 126 may be configured to store data/information of any size, shape and speed. Data lake 126 may include a database or datastore that stores a massive scale and variety of data in its native raw state and/or in an interpreted state. For example, as CQ platform 1002 generates raw data, that raw data may be stored within data lake 126 for later consumption, use, or interpretation by analytics server 122. Data lake 126 may include multiple separate databases and/or datastores that together make up data lake 126, or data lake 126 may be a singular datastore.

Dashboard 124 may be configured to provide an interactive user interface (e.g., for display on a display device) for displaying various metrics associated with the collected information/data stored in data lake 126.

In some examples, analytics server 122 may include a structured query language (SQL) server for managing and processing the information/data stored in data lake 126. In general, analytics server 122 may be configured to process and analyze the stored information/data across various platforms and various languages. Analytics server 122 may include an analytics module (not shown) for creating dashboard 124.

Content source(s) 128 may be embodied on one or more computing devices housed in one or more related or independent facilities that are configured to include information/data that may be useful to user 106. Some content source(s) 128 may store information associated with user 106 (e.g., account information). Other content sources(s) 128 may include information unrelated to user 106 (e.g., a website associated with electronics distribution). In general, content source(s) 128 may include one or more of databases, servers, websites (having one or more web pages), applications, online communities, blogs, news sites, electronic journals, social networks, etc. Content source(s) 128 may include public resources and private resources.

In one example embodiment, content source(s) 128 may include one or more of product database(s), order database(s), account databases, and one or more online communities. CQ platform 1002 may include web channel 130, chat bot 132, message controller 134, intent analysis system 136, query system 138, one or more databases 140, administrator (admin) portal 142, web server 144, API server 146 and, optionally, authentication server 148. Although not shown, one or more of components of CQ platform 1002 may be coupled with a data and control bus. It may be appreciated that, in some examples, one or more components of CQ platform 1002 may be distributed across one or more locations (e.g., such as across one or more virtual machines (VMs)) and may be communicatively connected via one or more networks (not shown).

In general, CQ platform 1002 may be configured to interface with client device 108, to provide an automated conversational querying interface (i.e., a chat bot interface) for communicating with user 106 to identify querying intents and to provide results of querying to user 106. CQ platform 1002 may be configured to interface with content sources(s) 128, to retrieve relevant content for a query based on the identified intent and configure the results for presentation to client device 108. CQ platform 1002 may also be configured to interface with live agent server 128, to initiate and provide live agent chat to client device via live agent 118, retrieve relevant content for a query based on the identified intent and configure the results for presentation to client device 108. CQ platform 1002 may also be configured to interface with analytics server 122, to provide conversational detail information/data for further analysis.

Although FIG. 14 illustrates live agent server 1200 and analytics server 122 as being separate from CQ platform 1002, in some examples, live agent server 1200 and/or analytics server 122 may be configured to be part of CQ platform 1002. In some examples, integration of live agent server 1200 and/or analytics server 122 into CQ platform 1002 may improve the ability of CQ platform 1002 to manage data flow, storage and processing of data/information via the components of CQ platform 1002, for improved operation of CQ platform 1002.

In some examples, CQ platform 1002 may be configured as a cloud-based platform comprising one or more virtual machines, with the ability to scale the number of virtual machines based on a current load (e.g., application usage) on CQ platform 1002. In this manner, CQ platform 1002 may ensure optimum resource utilization, and CQ platform 1002 may easily scale up or scale out its resources as the application usage grows. In some examples, CQ platform 1002 may be configured to support Infrastructure as a Service (IaaS) cloud computing service.

Web channel 130 may be configured to provide web chat control for CQ platform 1002, to enable communication between chat bot 132 and client application(s) 113 of client device 108. Web channel 130 may include one or more APIs (such as DirectLine API) that may be exposed, for example, to start a conversation, send a message, receive a message etc.

In an example embodiment, a client component of web channel 130 may include a hypertext markup language (HTML) file with JS and CSS files included in a website associated with CQ platform 1002 (referred to as the platform website). The JS and CSS files may be included in the platform web site (avnet.com/huckster.io/element14.com) in an HTML iframe to enable chat bot 132 in the website. Based on the target website, the styling may be changed but all of the JS/CSS files may connect to the same instance of chat bot 134 deployed by CQ platform 1002.

Chat bot 132 may include an artificial intelligence (AI) (e.g., machine learning) engine configured to conduct an automated conversation with user 106 via text-based communication such as text messages in a chat interface. CQ platform 1002, via chat bot 132, may be configured to handle at least an initial portion of a query session with user 106, for example, to determine an intent for the query, so that user 106 may be properly routed to live agent 118 to handle the intent. In other cases, CQ platform 1002, via chat bot 132, may provide sufficient information or resolution to user 106 without involving live agent 118. In some cases, AI-generated content segments may be distributed throughout a chat session.

Chat bot 132 may be configured to generate chat bot interface 150 on web page(s) of one or more websites, for providing an automated conversational chat session with user 106. In an example embodiment, chat bot 132 may be configured as a plug-n-play model, such that chat bot 132 may be plugged into any web page, by including an <iframe> within a <div> of an HTML document. Chat bot 132 may be configured to manage a conversation using one or more dialogs. Each chat with chat bot 132 may be associated with a conversation identifier (e.g., ConversationID). When a user initiates a chat with chat bot 132, a ConversationID may be generated. The ConversationID may be used to maintain a chat history across various websites. Chat bot 132 may be configured to read and analyze user input via chat bot interface 150, and generate conversational answer(s) to the user input, by further processing via intent analysis system 136 and query system 138.

Message controller 134 may be configured to direct messages between client device 108 and internet bot 132. Message controller 134 may post messages to internet bot 132 (from CQ platform 1002) and may obtain messages from internet bot 132 (from chat interface 150). Message controller 134 may also be configured to direct messages received from internet bot 132 to intent analysis system 136.

Intent analysis system 136 may be configured receive a message including user input from message controller 134. Intent analysis system 136 may be configured to identify an intent and entity(s) from the user input. Intent analysis system 136 may transmit the identified intent and entity(s) to query system 138.

Query system 138 may be configured receive the identified intent and entity(s) from message intent analysis system 136. Based on the intent/entity(s), query system 138 may be configured to determine whether to perform an automated search or to initiate handoff of communication to live agent server 1200. Query system 138 may also be configured to perform an automated search of relevant content among content source(s) 128 upon a determination to proceed with the automated search. Query system 138 may also be configured to format any search results for display on chat bot interface 150.

Database(s) 140 may be configured to store automated chat conversation dialog for a conversation session. In some examples, database(s) 140 may store state data related to the conversation dialog (e.g., ConversationID, user selections, web page/website information, user actions on a web page during the conversation session, etc.) In some examples, database(s) 140 may store conversation dialog for a live agent chat during the conversation session, as well as any suitable state data. In some examples, database(s) 140 may include a NoSQL database (e.g., a non-relational or not only relational) database, such as a multi-model NoSQL database. In other examples, database(s) 140 may include a relational database (e.g., a SQL database).

Admin portal 142 may be configured as an interface for communication between admin console 1161 and one or more components of CQ platform 1002, including intent analysis system 136. Administrator 1114 may interact with one or more components of CQ platform via admin portal 142, for example to adjust parameters of intent analysis system (or other components) for identifying intents from user input.

Web server 144 may be configured to interface with client device 108 via web client 1101. API server 146 may be configured to interface with content source(s) 128 and live agent server 1200 via one or more APIs.

CQ platform 1002 may, optionally, include authentication server 148. Authentication 148 may be configured to authenticate user 106, to enable user 106 to interact with CQ platform 1002. In some examples, CQ platform 148 may request that user 106 register with CQ platform 1002 prior to initiating chat bot interface 150, the first time user 106 visits the platform website. CQ platform 148 may store the user information in database(s) 140 (for example) upon registration, such as user identity, email, account information, etc.

Figure 15:
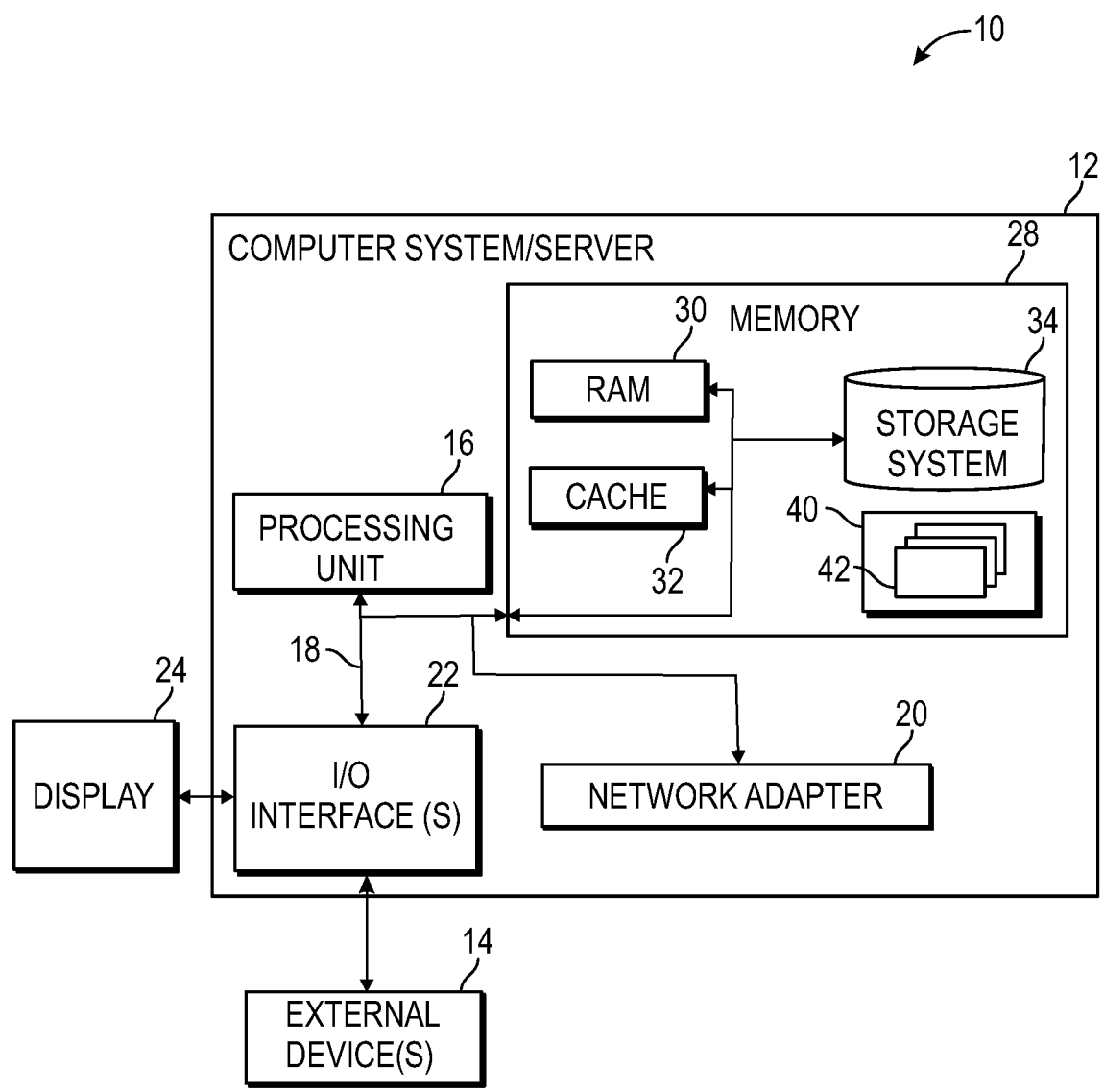
FIG. 15 illustrates a cloud computing node, according to example embodiments.

FIG. 15 illustrates a cloud computing node, according to example embodiments. In FIG. 15, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 16:
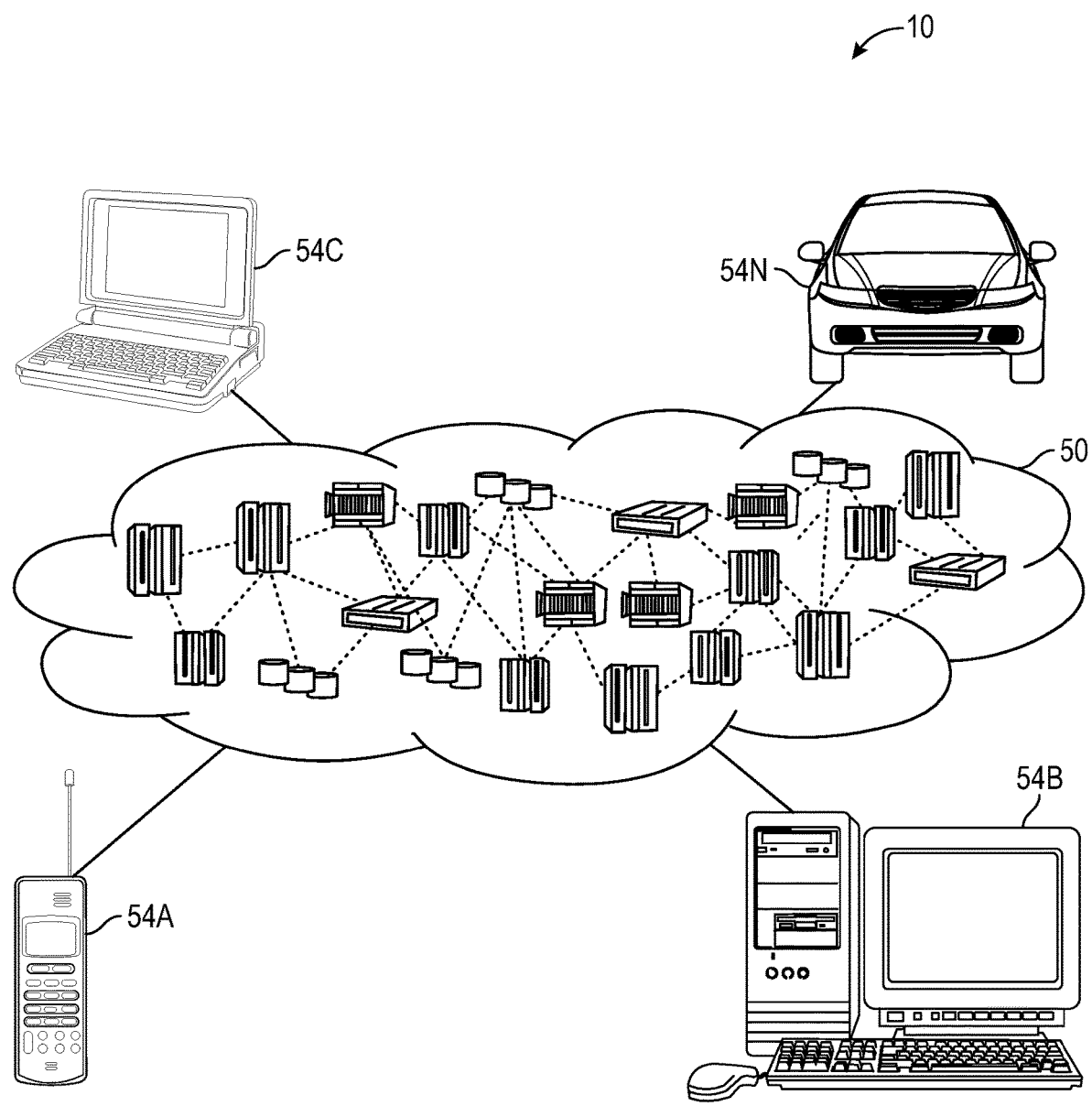
FIG. 16 illustrates a cloud computing environment, according to example embodiments.

Referring now to FIG. 16, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 16 are intended to be illustrative only and that computing nodes 10 and cloud computing environment 50 can communicate with any type of computerized device over any type of network and/or network addressable connection (e.g., using a web browser).

Figure 17:
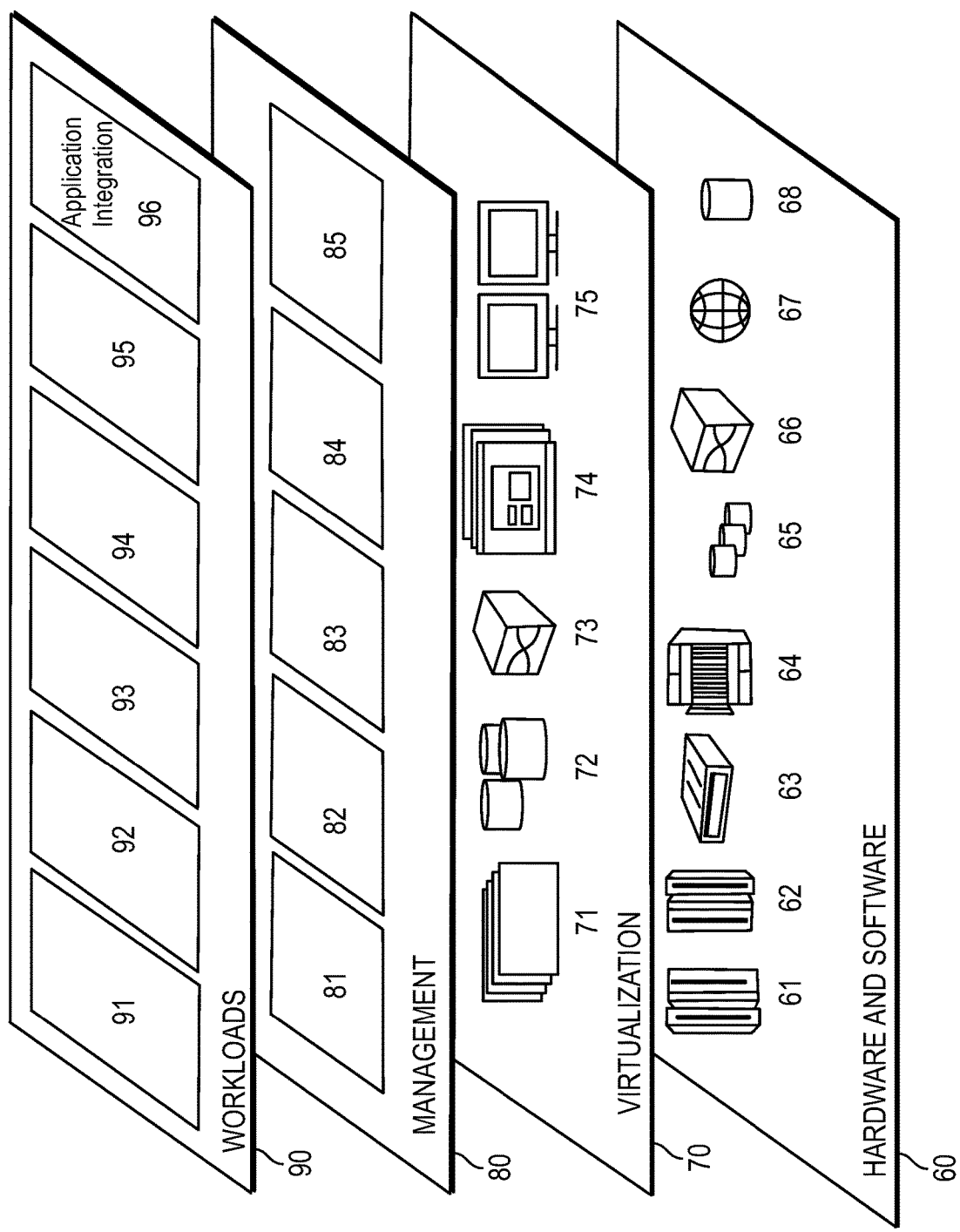
FIG. 17 illustrates abstraction model layers according to example embodiments.

Referring now to FIG. 17, a set of functional abstraction layers provided by cloud computing environment 50 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application integration 96.

Implementations of the invention may include a computer system/server 12 of FIG. 15 in which one or more of the program modules 42 are configured to perform (or cause the computer system/server 12 to perform) one of more functions of the application integration 96 of FIG. 17. For example, the one or more of the program modules 42 may be configured to: store one or more service connectors configured to connect a software system to another software system in the data repository, receive integration instructions, the integration instructions including at least one of an origin software system, a directionality of the integration, the directionality indicating whether the integration is unidirectional or bidirectional, a frequency of integration and a target software system, and perform the integration using the one or more service connectors according to the integration instructions.

While example embodiments have been described in conjunction with the example features outlined above, various alternatives, modifications, variations, improvements, and/or substantial equivalents, whether known or that are or may be presently unforeseen, may become apparent to those having at least ordinary skill in the art. Accordingly, the example embodiments, as set forth above, are intended to be illustrative, not limiting. Various changes may be made without departing from the spirit and thereof. Therefore, example embodiments are intended to embrace all known or later-developed alternatives, modifications, variations, improvements, and/or substantial equivalents.

What is claimed is:

1. A computer-implemented method of integrating services between different software systems, the computer having a processor and a data repository, the method comprising:
   storing, in the data repository, one or more service connectors configured to connect an origin software system to a target software system;
   receiving integration instructions, the integration instructions including at least one of:
   the origin software system;
   a directionality of the integration, the directionality indicating whether the integration is unidirectional or bidirectional;
   a frequency of integration; and
   the target software system; and
   performing the integration from the origin software system to the target software system using the one or more service connectors and based on the received integration instructions, wherein the original software system includes at least two different software systems that are connected to the target software system by only one of the one or more service connectors.

2. The method of claim 1, further comprising tracking transactions between connected systems.

3. The method of claim 2, wherein the tracking the transactions comprises determining an amount of data being transmitted between the connected software systems.

4. The method of claim 3, further comprising monitoring an integrity of the data transmitted between the connected software systems.

5. The method of claim 2, wherein the transactions are stored in a distributed ledger.

6. The method of claim 1, further comprising mapping one or more files flowing between the origin software system and the target software system.

7. The method of claim 6, further comprising displaying at least one of the origin software system, the directionality of the integration, the frequency of integration, the target software system, and the one or more files flowing between the origin software system and the software system.

8. The method of claim 1, wherein the one or more service connectors are pre-built service connectors.

9. The method of claim 1, wherein the integration instructions are received via at least one of:
   a natural language dialog box;
   voice instructions;
   a low-code dialog box; and
   coding language.

10. A system for integrating services between different software systems, the system comprising:
    a processor;
    a user interface functioning via the processor; and
    a repository accessible by the processor; wherein
    one or more service connectors configured to connect an origin software system to a target software system are stored in the repository;
    integration instructions are received, the integration instructions including at least one of:
    the origin software system;
    a directionality of the integration, the directionality indicating whether the integration is unidirectional or bidirectional;
    a frequency of integration; and
    the target software system; and
    the integration is performed from the origin software system to the target software system using the one or more service connectors and based on the integration instructions, wherein the original software system includes at least two different software systems that are connected to the target software system by only one of the one or more service connectors.

11. The system of claim 10, wherein transactions between connected systems are tracked.

12. The system of claim 11, wherein an amount of data being transmitted between the connected systems is determined.

13. The system of claim 12, wherein an integrity of the data transmitted between the connected systems is monitored.

14. The system of claim 10, wherein one or more files flowing between the origin software system and the target software system are mapped.

15. The system of claim 14, wherein at least one of the origin software system, the directionality of the integration, the frequency of integration, the target software system, and the one or more files flowing between the origin software system and the software system are displayed on a display device.

16. The system of claim 10, wherein the integration instructions are received via at least one of:
    a natural language dialog box;
    voice instructions;
    a low code dialog box; and
    coding language.

17. A computer program product comprising a non-transitory computer usable medium having control logic stored therein for causing a computer to integrate services between different software systems, the control logic comprising:

first computer readable program code means for storing one or more service connectors configured to connect an origin software system to a target software system in a data repository, wherein the original software system includes at least two different software systems that are connected to the target software system by only one of the one or more service connectors;

second computer readable program code means for receiving integration instructions, the integration instructions including at least one of:
the origin software system;
a directionality of the integration, the directionality indicating whether the integration is unidirectional or bidirectional;
a frequency of integration; and
the target software system; and third computer readable program code means for performing the integration from the origin software system to the target software system using the one or more service connectors according to the integration instructions.

18. The computer program product of claim 17, further comprising fourth computer readable program code means for mapping one or more files flowing between the origin software system and the target software system.

19. The computer program product of claim 17, further comprising fifth computer readable program code means for displaying at least one of the origin software system, the directionality of the integration, the frequency of integration, the target software system, and the one or more files flowing between the origin software system and the software system.

20. The computer program product of claim 17, further comprising sixth computer readable program code means for tracking transactions between connected systems.

* * * * *